(12) United States Patent
Hon et al.

(10) Patent No.: US 8,554,502 B2
(45) Date of Patent: Oct. 8, 2013

(54) METHOD FOR CALCULATING PROBE MOUNTING POSITION IN ON-MACHINE MEASURING DEVICE

(75) Inventors: Yonpyo Hon, Yamanashi (JP); Kenzo Ebihara, Yamanashi (JP); Masayuki Hamura, Yamanashi (JP)

(73) Assignee: Fanuc Corporation, Yamanashi (JP)

(*) Notice: Subject to any disclaimer, the term of this patent is extended or adjusted under 35 U.S.C. 154(b) by 316 days.

(21) Appl. No.: 13/026,215

(22) Filed: Feb. 12, 2011

(65) Prior Publication Data

US 2011/0246115 A1 Oct. 6, 2011

(30) Foreign Application Priority Data

Mar. 31, 2010 (JP) ................................ 2010-082095

(51) Int. Cl.
*G06F 19/00* (2011.01)
(52) U.S. Cl.
USPC .......................................... 702/95; 702/168
(58) Field of Classification Search
USPC ............... 702/95, 168; 700/56, 193; 356/609; 73/105
See application file for complete search history.

(56) References Cited

U.S. PATENT DOCUMENTS 6,763,319 B2 * 7/2004 Handa et al. ................. 702/168
2010/0030368 A1 2/2010 Hon et al.

FOREIGN PATENT DOCUMENTS

| JP | 11123635 A | 5/1999 |
| JP | 2002267438 A | 9/2002 |
| JP | 2002357415 A | 12/2002 |
| JP | 2009018367 A | 1/2009 |
| JP | 2010-32373 A | 2/2010 |
| JP | 2011032373 A | 2/2011 |

* cited by examiner

*Primary Examiner* — Sujoy Kundu
(74) *Attorney, Agent, or Firm* — Lowe, Hauptman & Ham

(57) ABSTRACT

A measurement program is created for measurement performed by moving X- and Z-axes so that a central axis of a probe is perpendicular to the surface of a reference sphere, and errors are obtained between original probe position data and probe position data obtained by measurement performed at two different angles $\theta_1$ and $\theta_2$ of a rotary axis according to the created measurement program. Position coordinates of a tip end of the probe at the two different angles $\theta_1$ and $\theta_2$ of the rotary axis are corrected so that the errors are zero. Then, the X- and Z-axis coordinates are corrected based on a positive or negative phased shift amount, and measurement errors are obtained by calculation. A real probe tip position is defined by the X- and Z-axis coordinates corrected by a correction amount with which the obtained measurement errors become minimum.

18 Claims, 14 Drawing Sheets

$\Delta X = \Delta ZP * \sin \theta$
$\Delta Z = \Delta ZP * \cos \theta$

B-AXIS ROTATION
CENTER

METHOD FOR CALCULATING PROBE MOUNTING POSITION IN ON-MACHINE MEASURING DEVICE

RELATED APPLICATIONS

The present application is based on, and claims priority from, Japanese Application Number 2010-082095, filed Mar. 31, 2010, the disclosure of which is hereby incorporated by reference herein in its entirety.

BACKGROUND OF THE INVENTION

1. Field of the Invention

The present invention relates to a method for calculating a probe mounting position in an on-machine measuring device attached to a machine tool as shape measurement of a workpiece is performed using the on-machine measuring device.

2. Description of the Related Art

Corrective machining based on on-machine measurement is essential for the achievement of shape accuracy on the order of nanometers in ultra-precision measurement. Recently, machined shapes that require corrective machining based on on-machine measurement have gradually become complicated. Therefore, shape accuracy on the order of nanometers also needs to be accurately achieved for shapes with sharp gradients of 60 degrees or more. Since the demand for simultaneous five-axis machining is expected to increase, moreover, it is apprehended that on-machine measurement of three-dimensional shapes based on simultaneous five-axis machining will have to be performed in the future.

A system configured to measure the shapes of measurement objects using an on-machine measuring device is disclosed in Japanese Patent Application Laid-Open No. 2010-32373. This system is characterized in that on-machine measurement of three-dimensional shapes based on simultaneous five-axis machining, as well as of shapes with sharp gradients of 60 degrees or more, can be achieved by performing simultaneous five-axis machining measurement with the additional use of a rotary axis in the conventional on-machine measurement based on linear axes only.

According to a prior art technique, a probe of an on-machine measuring device is mounted on a rotary axis in such a manner that its tip end portion is maximally aligned with the rotation center of the rotary axis on a plane perpendicular to the rotary axis, and adjusted by means of a size measuring device, such as a pair of calipers or a micrometer. Thereafter, a reference object (e.g., sphere) is measured and finely adjusted by using a stage, feed screw, hammer, etc., so that the probe tip end portion approaches the rotation center of the rotary axis. Similar adjustment or fine adjustment is also performed in the case where the probe is mounted off the rotation center.

In on-machine measurement with the additional use of a rotary axis, it is most important to accurately calculate the positional relationship between the position of a tip end of a probe and the rotation center of the rotary axis on which an on-machine measuring device is mounted. A method for calculating a probe mounting position using a flat plate is applied for a patent in Japan (Japanese Patent Application No. 2009-295501, filed Dec. 25, 2009).

If the relative probe mounting position is erroneous, the probe cannot be located during rotation measurement, so that accurate measurement on the order of nanometers cannot be performed.

Conventionally, however, manual adjustment needs to be repeated to locate the accurate probe mounting position. Accordingly, the adjustment takes much time and labor and depends considerably on the skill of an operator who performs the adjustment.

Further, the method for calculating a probe mounting position in an on-machine measuring device is based on arithmetic expressions, so that noise, error, etc., may be amplified during measurement. Thus, the calculated accuracy may be reduced, so that it needs to be corrected to ensure ultra-precision measurement that requires high accuracy.

SUMMARY OF THE INVENTION

Accordingly, the object of the present invention is to provide a method for calculating a probe mounting position in an on-machine measuring device, in which the distance between a tip end of a probe and the rotation center of a rotary axis on which the on-machine measuring device is mounted, which is calculated by various arithmetic operations, is corrected in on-machine measurement using the rotary axis, based on results of measurement of a reference sphere.

In a method for calculating a probe mounting position in an on-machine measuring device according to the present invention, the on-machine measuring device is mounted on a single rotary axis of a machine tool having at least three linear axes and the rotary axis. Three linear axes extend at right angles to one another, one of the linear axes is aligned with the direction of the rotary axis, and a probe of the on-machine measuring device moves at right angles to the direction of the rotary axis. A displacement of the probe is detected by a probe position detecting device mounted on the on-machine measuring device. The distance between a rotation center of the rotary axis and a tip end of a measuring head mounted on a tip end of the probe is calculated with the tip end of the measuring head held against a reference sphere attached to the machine tool. The calculating method comprises steps of:

(1) setting linear axes which move in two directions perpendicular to the rotary axis, out of the linear axes, as first and second linear axes, and previously defining a position of the tip end of the measuring head relative to the center of the rotary axis as coordinates of the first and second linear axes;

(2) creating a measurement program for measurement performed at two different predetermined angles of the rotary axis by moving the first and second linear axes so that a central axis of the probe is perpendicular to the surface of the reference sphere;

(3) obtaining, as respective measurement errors at the two angles of the rotary axis, errors between original displacement data of the probe and displacement data of the probe measured at the two angles according to the created measurement program;

(4) obtaining displacements of the first and second linear axes with which the measurement errors become zero respectively, as respective first correction amounts at the two angles;

(5) obtaining, as reference coordinates, coordinates of the first and second linear axes at the two angles of the measurement program, corrected with the first correction amounts, and further obtaining, as corrected coordinates, coordinates of the first and second linear axes at the two angles, using the measurement program created in the step (2), based on the position obtained by correcting the position of the tip end of the measuring head, defined in the step (1), with second correction amounts which are increased or decreased in stages respectively by minimum units equivalent to position detection resolutions of the linear axes, within a predetermined range; and (6) correcting the coordinates of the first and second linear axes, defined in the step (1), with the second correction amount with which the differences between the reference coordinates and the corrected coordinates, individually obtained in the step (5), become minimum, and obtaining final coordinates of the first and second linear axes at the position of the tip end of the measuring head relative to the center of the rotary axis.

The above step (5) may comprise steps of:

(5-1) obtaining, as the reference coordinates, the coordinates of the first and second linear axes at the two angles of the measurement program, corrected with the first correction amounts, and further obtaining, as the corrected coordinates, the coordinates of the first and second linear axes at the two angles, using the measurement program created in the step (2), based on a position obtained by subtracting from the coordinates of the first and second linear axes, defined in the step (1), the second correction amounts which are obtained by multiplying the position detection resolutions of the linear axes by a positive integer within a predetermined range; and (5-2) correcting the coordinates of the first and second linear axes, defined in the step (1), with the second correction amounts with which the differences between the reference coordinates and the corrected coordinates, obtained in the step (5-1), become less than a predetermined error, and obtaining the final coordinates of the first and second linear axes at the position of the tip end of the measuring head relative to the center of the rotary axis;

and further, if the error is not less than the predetermined error in the steps (5-1) and (5-2), the above step (5) may further comprise steps of:

(5-3) obtaining, as the corrected coordinates, the coordinates of the first and second linear axes at the two angles, using the measurement program created in the above step (2), based on a position obtained by subtracting the second correction amounts from the coordinates of the first linear axis defined in the above step (1) and further adding the second correction amounts to the coordinates of the second linear axis defined in the above step (1); and (5-4) correcting the coordinates of the first and second linear axes, defined in the above step (1), with the second correction amounts with which the differences between the reference coordinates and the corrected coordinates, obtained in the step (5-3), become less than a predetermined error, and obtaining the final coordinates of the first and second linear axes at the position of the tip end of the measuring head relative to the center of the rotary axis;

and further, if the error is not less than the predetermined error in the steps (5-1) to (5-4), the above step (5) may further comprise steps of:

(5-5) obtaining, as the corrected coordinates, the coordinates of the first and second linear axes at the two angles, using the measurement program created in the above step (2), based on a position obtained by adding the second correction amounts to the coordinates of the first linear axis defined in the above step (1) and further subtracting the second correction amounts from the coordinates of the second linear axis defined in the above step (1); and (5-6) correcting the coordinates of the first and second linear axes, defined in the step (1), with the second correction amounts with which the differences between the reference coordinates and the corrected coordinates, obtained in the step (5-5), become less than a predetermined error, and obtaining the final coordinates of the first and second linear axes at the position of the tip end of the measuring head relative to the center of the rotary axis;

and further, if the error is not less than the predetermined error in the steps (5-1) to (5-6), the above step (5) may further comprise steps of:

(5-7) obtaining, as the corrected coordinates, the coordinates of the first and second linear axes at the two angles, using the measurement program created in the above step (2), based on a position obtained by adding the second correction amounts respectively to the coordinates of the first and second linear axes defined in the above step (1); and (5-8) correcting the coordinates of the first and second linear axes, defined in the above step (1), with the second correction amounts with which the differences between the reference coordinates and the corrected coordinates, obtained in the step (5-7), become less than a predetermined error, and obtaining the final coordinates of the first and second linear axes at the position of the tip end of the measuring head relative to the center of the rotary axis;

Preferably, the reference sphere has shape accuracy of 100 nanometers or less.

According to the present invention, there may be provided a method for calculating a probe mounting position in an on-machine measuring device, in which the distance between a tip end of a probe and the rotation center of a rotary axis on which the on-machine measuring device is mounted, which is calculated by various arithmetic operations, is corrected in on-machine measurement using the rotary axis, based on results of measurement of a reference sphere.

BRIEF DESCRIPTION OF THE DRAWINGS

The above and other objects and features of the present invention will be obvious from the ensuing description of embodiments with reference to the accompanying drawings, in which:

FIGS. 9A and 9B illustrate a theoretical formula for changing the abnormal trajectory shown in FIG. 8B into the normal trajectory and the way a real probe mounting position $(X_0, Z_0)$ is obtained using the formula, in which FIG. 9A is an enlarged diagram of a region indicated by the dash-dotted line in FIG. 8B;

DETAILED DESCRIPTION OF THE PREFERRED EMBODIMENTS

An outline of a method for calculating a probe mounting position in an on-machine measuring device according to the present invention will be described first. The present invention is characterized in that the distance between a tip end of a probe and the rotation center of a rotary axis on which the on-machine measuring device is mounted, which is calculated by various arithmetic operations, is corrected in on-machine measurement using the rotary axis, based on results of measurement of a reference sphere, whereby ultra-precision rotation measurement on the order of nanometers is achieved.

Figure 11:
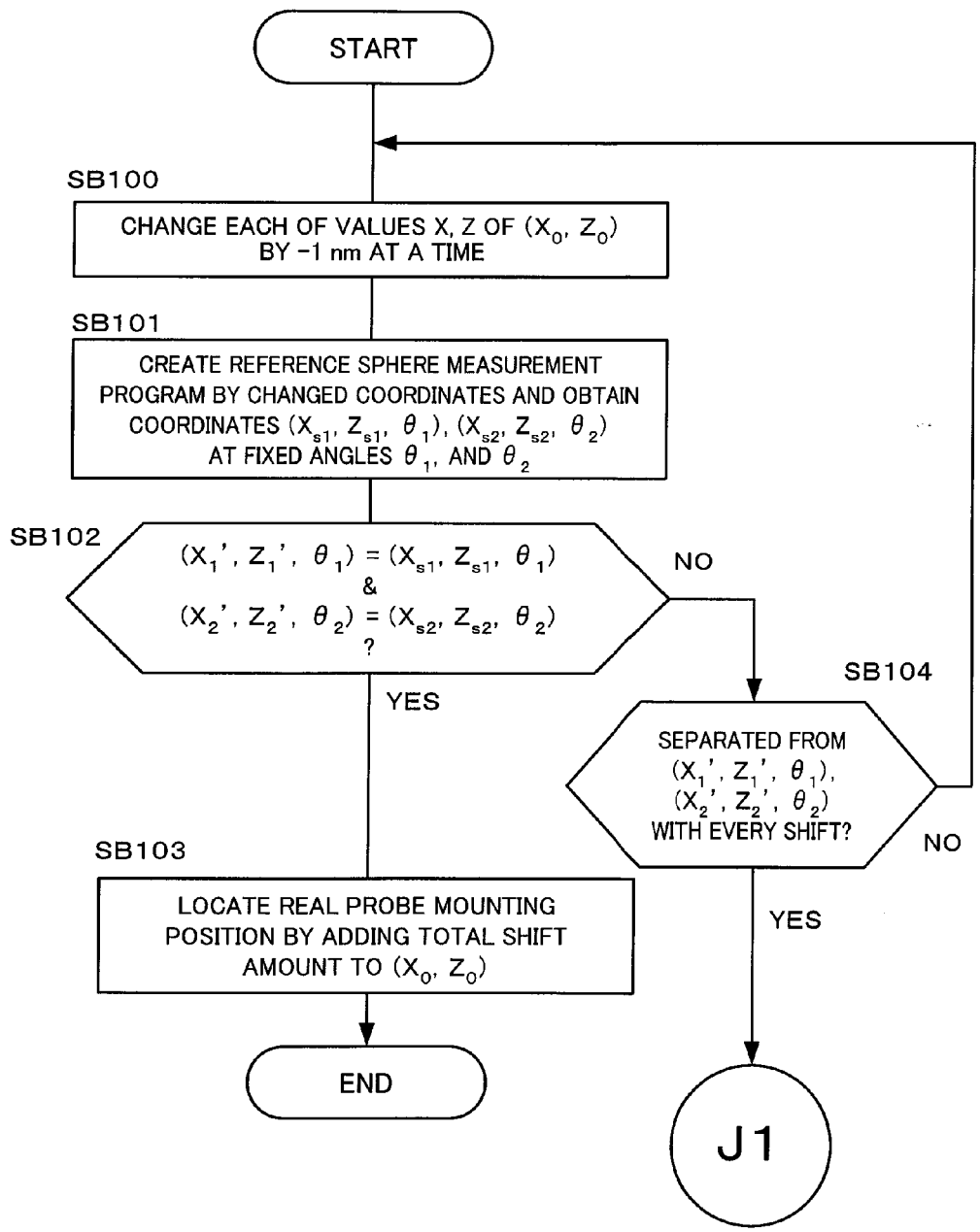
FIG. 11 is a flowchart illustrating a preliminary stage (first stage) for improving the accuracy of the calculated probe mounting position $(X_0, Z_0)$ by measuring the reference sphere by means of the probe.
Figure 12:
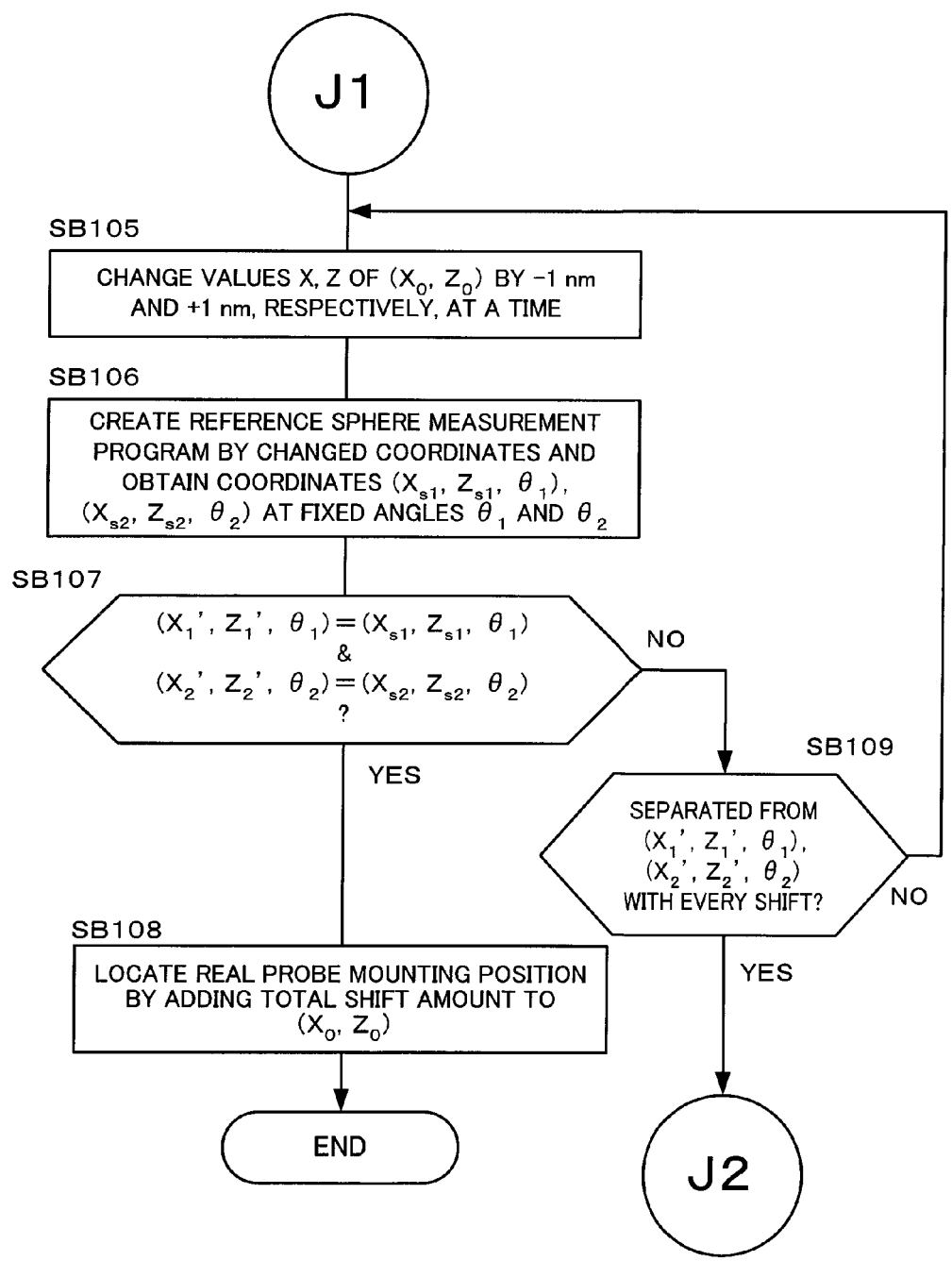
FIG. 12 is a flowchart illustrating a preliminary stage (second stage) for improving the accuracy of the calculated probe mounting position (distance between the B-axis rotation center and the measuring head on the probe of the on-machine measuring device) by measuring the reference sphere by means of the probe.
Figure 13:
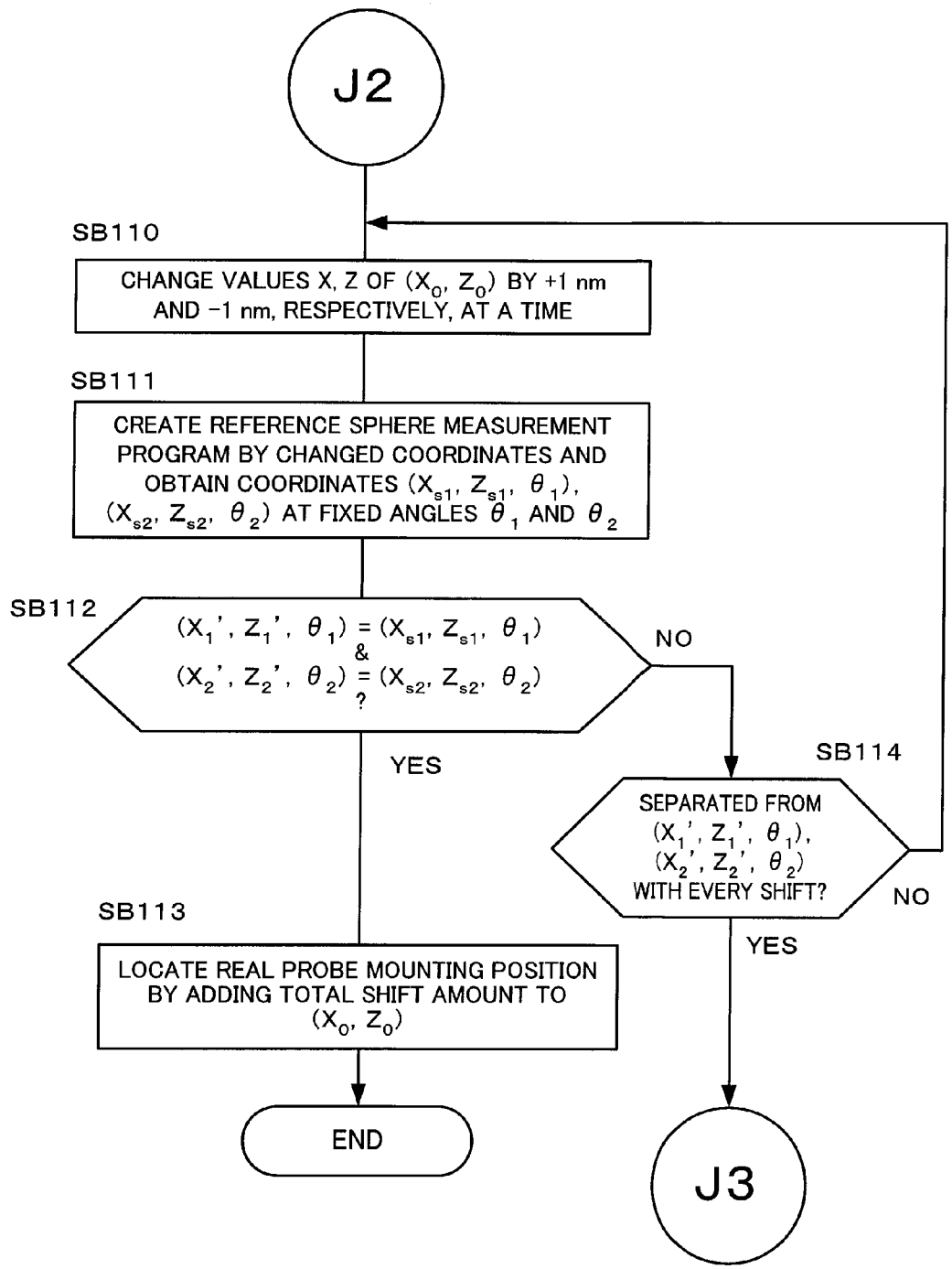
FIG. 13 is a flowchart illustrating a preliminary stage (third stage) for improving the accuracy of the calculated probe mounting position (distance between the B-axis rotation center and the measuring head on the probe of the on-machine measuring device) by measuring the reference sphere by means of the probe.
Figure 14:
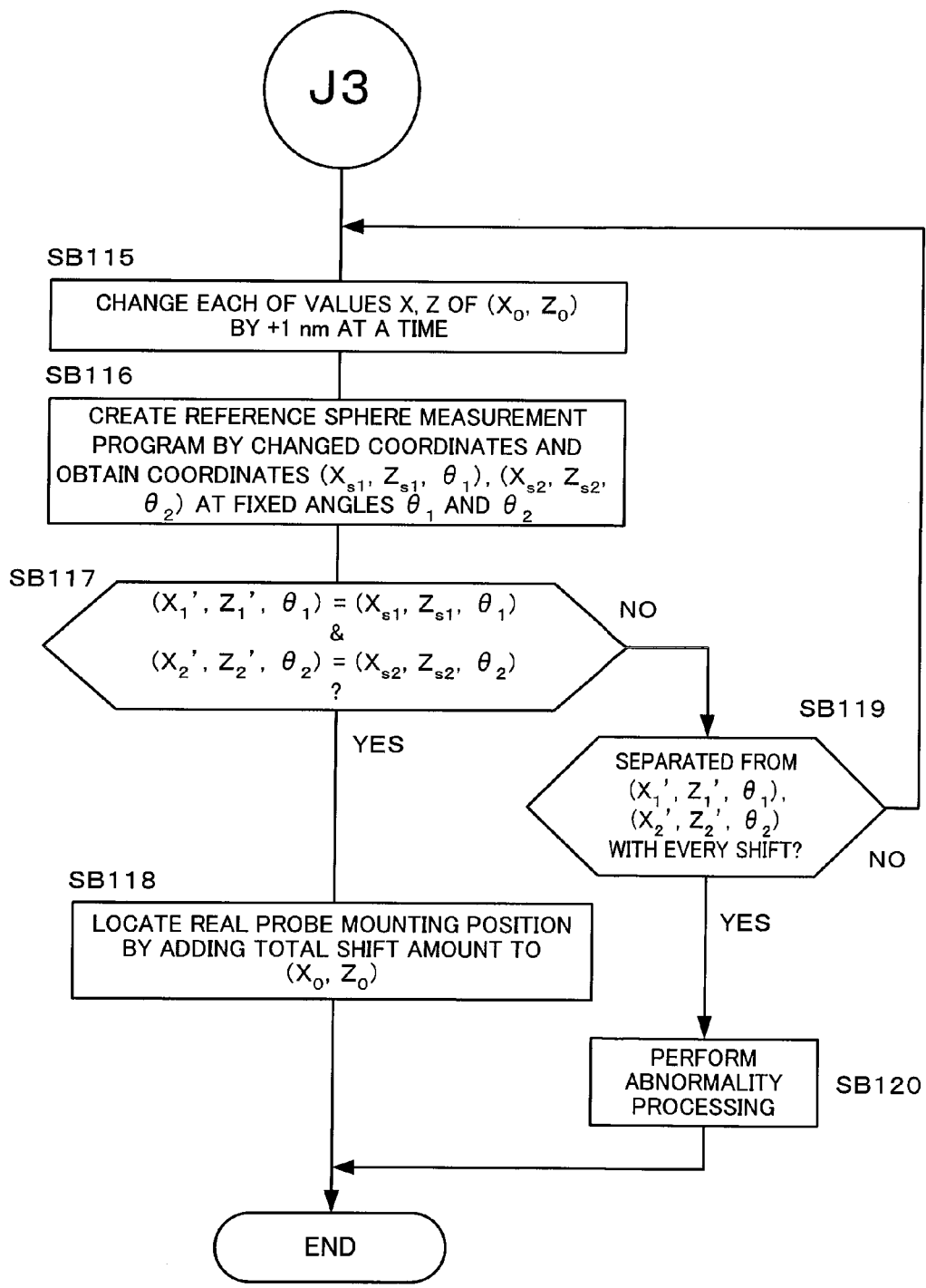
FIG. 14 is a flowchart illustrating a preliminary stage (fourth stage) for improving the accuracy of the calculated probe mounting position (distance between the B-axis rotation center and the measuring head on the probe of the on-machine measuring device) by measuring the reference sphere by means of the probe.

Specifically, (a) the position of the tip end of the probe relative to the center of the rotary axis on which the probe is mounted is previously defined by X- and Z-axis coordinates, (b) a reference sphere measurement program for measurement performed by moving X- and Z-axes so that a central axis of the probe is perpendicular to the surface of the reference sphere is created, (c) errors between original probe position data and position data obtained by measurement performed at two different angles $\theta_1$ and $\theta_2$ of the rotary axis according to the created reference sphere measurement program are obtained as measurement errors, (d) the position coordinates of the tip end of the probe at the two different angles $\theta_1$ and $\theta_2$ of the rotary axis are corrected so that the measurement errors are zero, (e) the X- and Z-axis coordinates are corrected in units of the detection resolution of linear axes, based on a positive or negative shift amount ("total shift amount" described in connection with Step SB103 of FIG. 11, Step SB108 of FIG. 12, Step SB113 of FIG. 13, or Step SB118 of FIG. 14), and corrected measurement errors are obtained by calculation, and (f) the X- and Z-axis coordinates corrected by a correction amount (total shift amount) which corresponds to the minimum one, out of the obtained measuring errors within a desired measurement error accuracy, are assumed to represent a real probe tip position.

Figure 1:
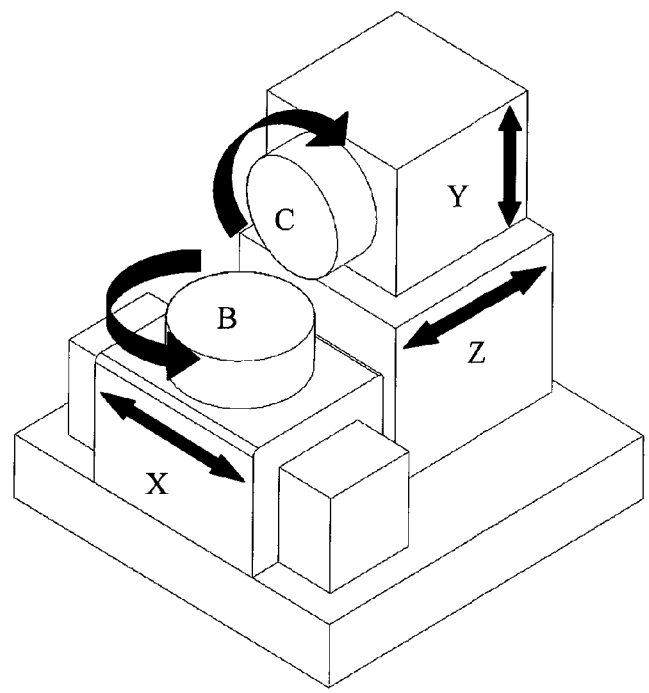
FIG. 1 is a diagram illustrating a machine tool which is controlled by a numerical controller and has three linear axes (X-, Y- and Z-axes) and two rotary axes (B- and C-axes)

FIG. 1 is a diagram for explaining an example of a machine tool which is controlled by a numerical controller and has at least three linear axes and at least one rotary axis. The machine tool has X-, Y- and Z-axes, which are linear axes, and further has a B-axis, which is a rotary axis on the X-axis, and a C-axis, which is a rotary axis on the Y-axis, thereby allowing simultaneous five-axis control. With this configuration, these axes are respectively controlled on the order of nanometers so that machining of a workpiece can be carried out with accuracy on the order of nanometers.

Figure 2:
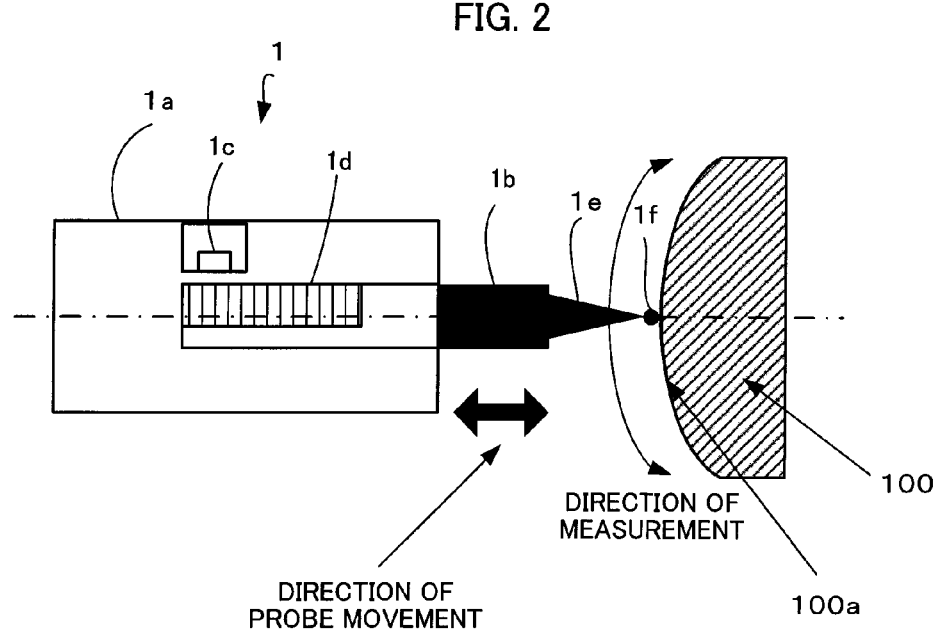
FIG. 2 is a sectional view illustrating an essential part of an example of an on-machine measuring device with a probe, which is moved along the surface of an object to be measured so that the shape of the measurement object can be measured based on the displacement of the probe.

FIG. 2 is a sectional view of an essential part of an on-machine measuring device for explaining an example of the on-machine measuring device. The on-machine measuring device 1 includes a case 1a and a probe 1b which is housed in the case 1a. The probe 1b is a movable portion which can move in a central axis direction thereof by means of a bearing (not shown) such as an air bearing attached to the case 1a. A measuring head rod 1e formed of a thin rod-like member is mounted on a tip end of the probe 1b. Further, a spherical measuring head 1f is mounted on a tip end of the measuring head rod 1e. The spherical measuring head 1f is brought into contact with a surface 100a to be measured of a measurement object 100 to perform shape measurement. A surface shape of the surface 100a to be measured of the measurement object 100 is measured by moving the probe 1b along the surface 100a to be measured and measuring the displacement of the probe 1b.

The on-machine measuring device 1 includes a linear scale 1d and a laser head 1c, which constitute displacement detecting means of the probe 1b, in the case 1a. The displacement detecting means using a laser head 1c and a linear scale 1d is known. As shown in FIG. 2, the on-machine measuring device 1 is moved along the surface 100a to be measured of the measurement object 100, and the displacement of the probe 1b is detected by the displacement detecting means (the linear scale 1d and the laser head 1c). The detection output of the displacement detecting means is input to a personal computer 11 as a measurement signal ipf from the on-machine measuring device 1, and stored in the personal computer 11 as position information of the probe 1b, as shown in FIG. 3.

Figure 3:
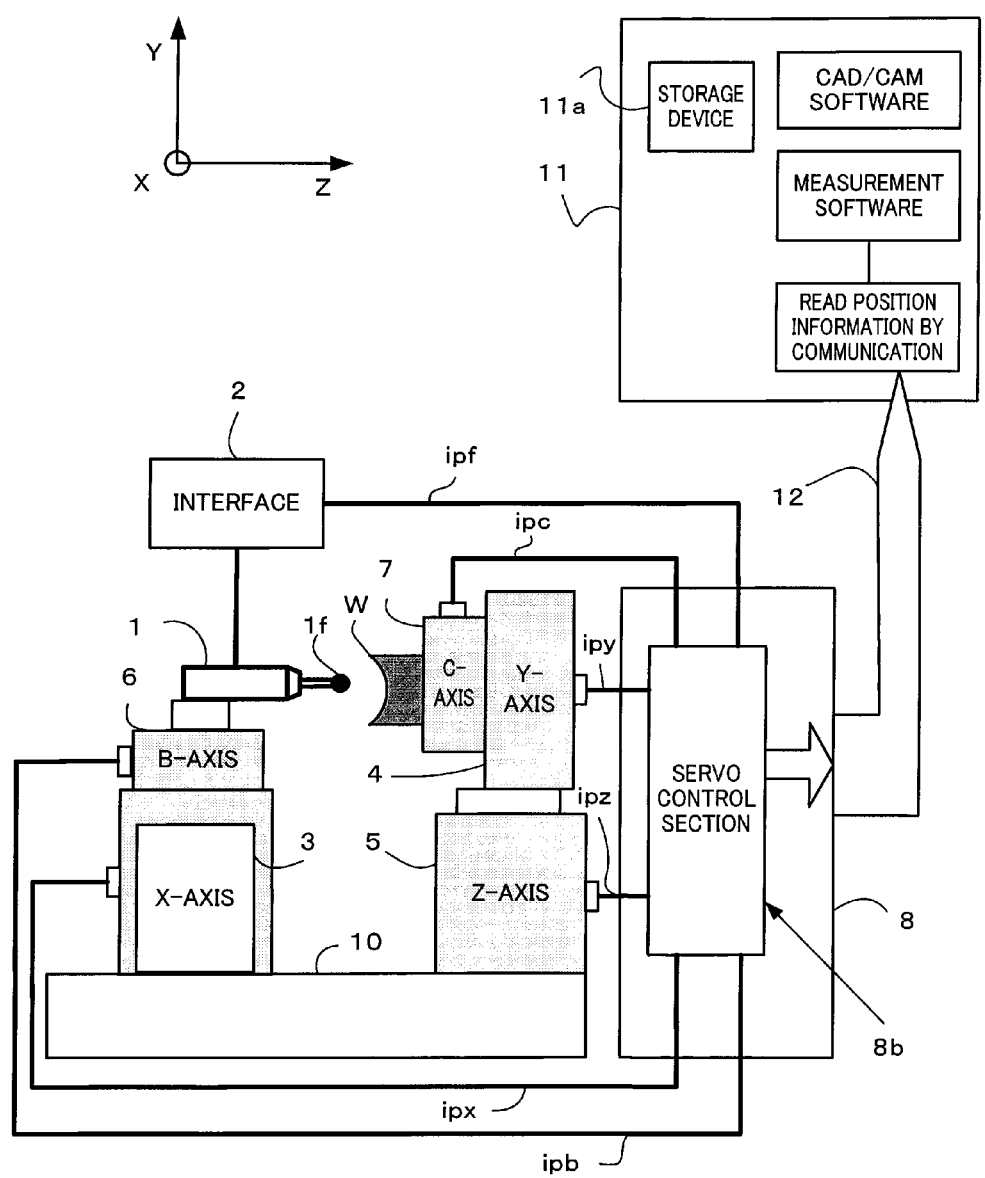
FIG. 3 is a diagram illustrating a system including the machine tool with the on-machine measuring device and the numerical controller for controlling the machine tool.

FIG. 3 is a diagram for explaining an example in which the on-machine measuring device and the machine tool are coupled. The X-, Y-, Z-, B- and C-axes, which are five movable axes of the machine tool, respectively have interfaces having the same circuit configuration to control the respective axes, and the on-machine measuring device 1 also has an interface of the same circuit configuration. The on-machine measuring device 1 does not constitute a movable axis of the machine tool. However, it is assumed here that the on-machine measuring device 1 is one movable axis of the machine tool, and thus a signal obtained from the on-machine measuring device 1 is stored in the personal computer 11 via a servo control section 8b of a numerical controller 8 in the same manner as the signals obtained from the respective movable axes (X-, Y-, Z-, B- and C-axes) of the machine tool.

With the five movable axes of the machine tool and the on-machine measuring device having interfaces of the same circuit configuration, as described above, the following operations are performed in measurement. Position detection signals from the respective movable axes and a position detection signal from the on-machine measuring device 1 are easily input in synchronization with one another to the servo control section 8b (feed shaft drive control section) of the numerical controller 8. The numerical controller 8 and the personal computer 11 are in communication on a LAN via Ethernet (registered trademark) 12, and the position information of the respective axes and the displacement data of the probe of the on-machine measuring device 1 are simultaneously input to the personal computer 11, which is an external storage device. Further, measurement software is used to save the input position information of the respective axes and the input displacement data of the probe.

FIG. 3 shows an example in which measurement signals from the on-machine measuring device 1 are input to the personal computer 11 via the numerical controller 8. In this example, the respective movable axes (X-, Y-, Z-, B-, and C-axes) of the machine tool and the on-machine measuring device 1 mounted on the B-axis have the same interfaces. Thus, the position detection signals from the respective movable axes and the measurement signal from the on-machine measuring device 1 are easily input in synchronization with one another to the feed shaft drive control section (servo control section 8b) of the numerical controller 8.

Position detection signals ipx, ipy, ipz, ipb, and ipc respectively output from position detecting devices (not shown) mounted in servomotors for driving the respective movable axes (the X-axis 3, Y-axis 4, Z-axis 5, B-axis 6, and C-axis 7) of the machine tool are fed back and input to the servo control section 8b of the numerical controller 8 via the respective interfaces (not shown). Moreover, a position detection signal ipf, which is a measurement signal on the displacement of the probe 1b (see FIG. 2), is input from the on-machine measuring device 1, which measures the surface shape of an object W to be machined, to the servo control section 8b via the interface 2 in synchronization with the position detection signals ipx, ipy, ipz, ipb and ipc.

The numerical controller 8 includes storage means (not shown) which stores the position information from the respective movable axes of the machine tool and the measurement information (position information) from the on-machine measuring device 1 and an interface for delivering the position information stored in the storage means to the personal computer 11, which is an external device. The calculation of the probe mounting position in on-machine measurement according to the present invention can be performed based on the measurement information (position information) stored in the storage means in the numerical controller 8.

Since the position detection signals, which are feedback signals from the respective movable axes of the machine tool, and the measurement signal from the on-machine measuring device are received by the servo control section 8b of the numerical controller 8 via the interfaces having the same circuit configuration, the measurement signals (axis position detection signals) from the position detecting devices of the respective movable axes and the measurement signal (position detection signal) from the on-machine measuring device 1 are easily input in synchronization with one another to the numerical controller 8. The measurement signals input to the numerical controller 8 are stored as the position information in the storage means (not shown) of the numerical controller 8.

The numerical controller 8 communicates on a LAN with the personal computer 11 as the external device, for example, via Ethernet (registered trademark) 12 and loads the position information from the respective movable axes and the measurement information from the on-machine measuring device 1 into the storage device 11a mounted in the personal computer 11 in synchronization with one another at each sampling period.

The measurement software is stored in the personal computer 11 to perform necessary arithmetic processing such as shape measurement of the object to be machined according to conventional techniques and based on the position information read in via the numerical controller 8.

Figure 4:
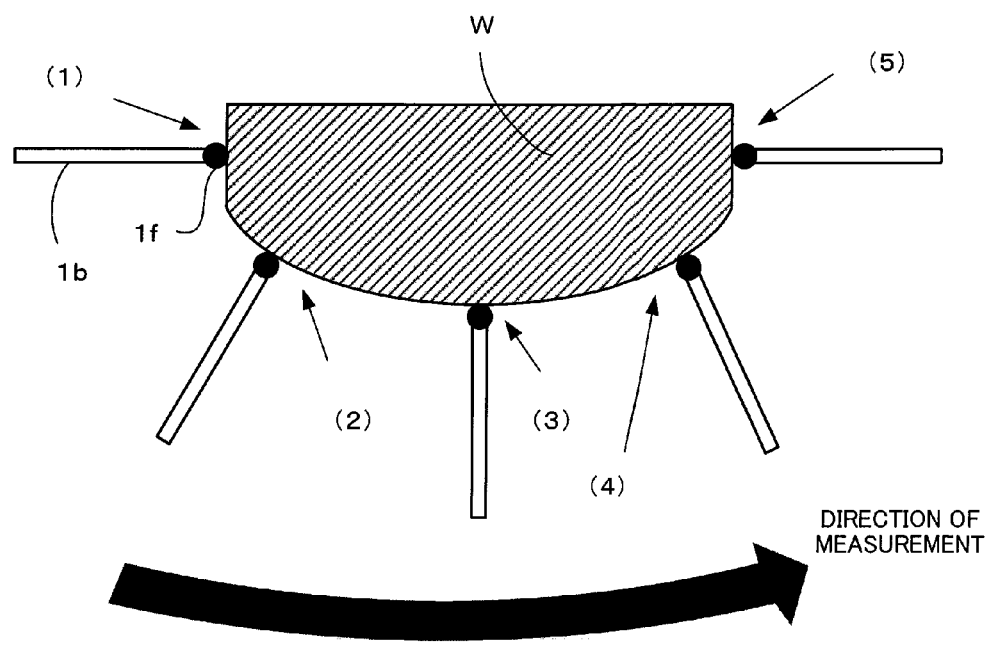
FIG. 4 is a diagram for explaining measurement of a surface of a workpiece having a curved surface based on the displacement of the probe of the on-machine measuring device.

FIG. 4 is a diagram for explaining measurement of a surface of a workpiece having a curved surface. The on-machine measuring device 1 is mounted on a rotary axis (the B-axis in the example of FIG. 3), and on-machine measurement is performed by displacing the probe 1b having the spherical measuring head 1f on a tip end side thereof for measuring the surface of the workpiece having the curved surface. The measuring head rod 1e is not shown in FIG. 4.

A ruby sphere as the spherical measuring head 1f is brought into contact with the curved surface, which is the surface of the workpiece W, and the on-machine measuring device 1 is caused to scan while moving to follow the surface under simultaneous control of the respective movable axes to measure the surface of the workpiece having the curved surface. The scanning by the probe 1b is performed in the order of (1)→(2)→(3)→(4)→(5) as shown in FIG. 4. Then, the displacement of the probe 1b (a movable axis of the on-machine measuring device 1) is detected. In this way, on-machine measurement of the surface shape of the workpiece is carried out. In this on-machine measurement, the respective movable axes of the machine tool are simultaneously controlled so that the central axis of the probe 1b is always oriented in a direction perpendicular to the surface of the workpiece. Accordingly, only a point where the central axis of the probe 1b intersects with the tip end of the spherical measuring head 1f is ideally in contact with the surface of the workpiece W. In this way, measurement can also be performed at an angle of 90 degrees or more, which cannot be performed by the conventional techniques. Moreover, since the measurement is always carried out at one point (i.e., the point where the central axis of the probe 1b intersects with the tip end of the spherical measuring head 1f) on the spherical measuring head 1f, the influence of the shape error of the spherical measuring head 1f can be minimized.

Figure 5:
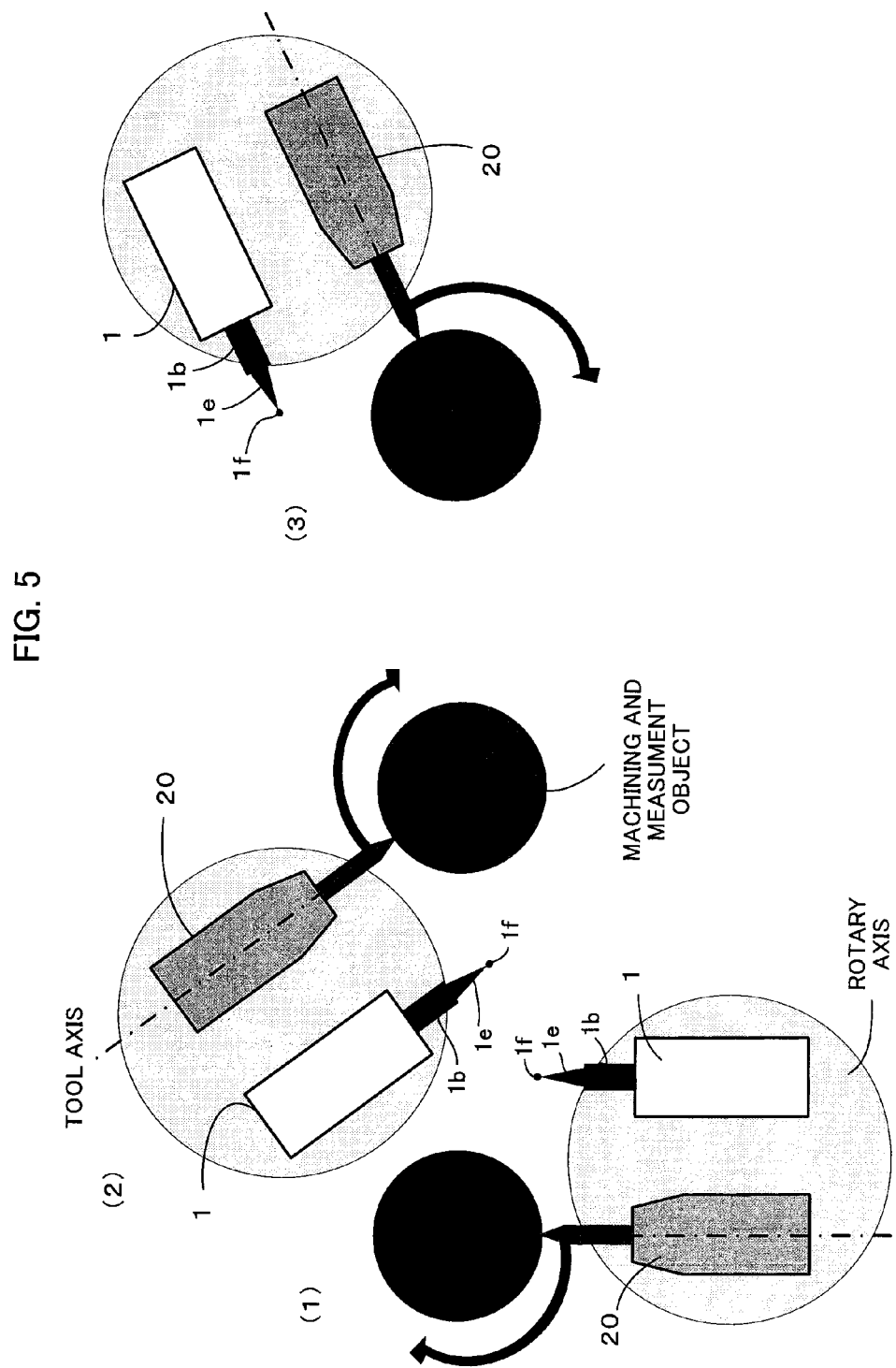
FIG. 5 is a diagram for explaining machining with a machining tool in a machining device in the case where the on-machine measuring device and the machining device are mounted on a single rotary axis.
Figure 6:
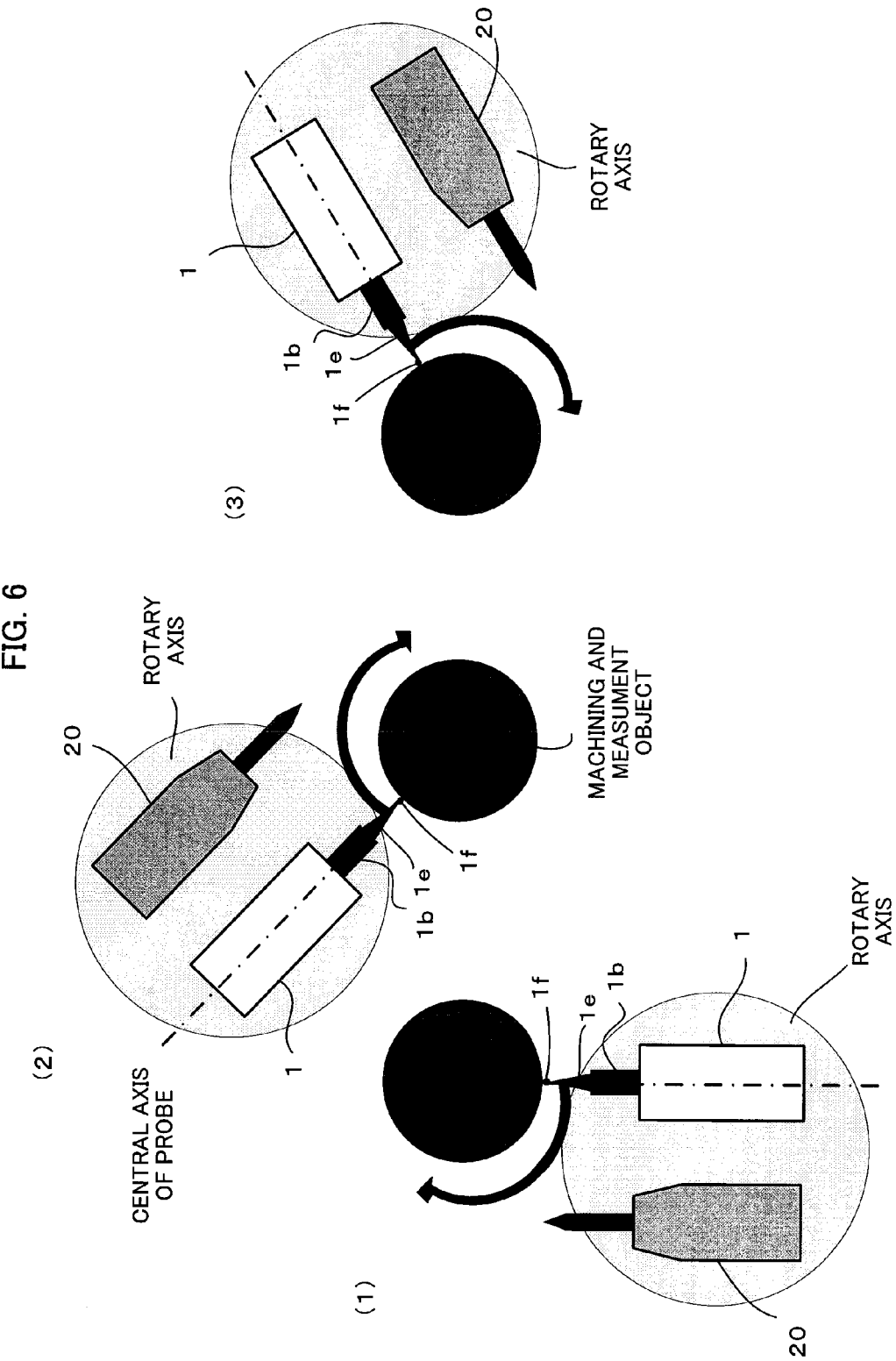
FIG. 6 is a diagram for explaining measurement by the on-machine measuring device in the case where the on-machine measuring device and the machining device are mounted on the single rotary axis.

Referring now to FIGS. 5 and 6, there will be described machining and measurement in the case where the on-machine measuring device 1 and a machining tool are mounted on the same rotary axis.

FIG. 5 is a diagram for explaining machining with a machining tool 21 in a machining device 20 such as a spindle in the case where the on-machine measuring device 1 and the machining device 20 are mounted on one rotary axis 30. The machining device 20 mounted on the rotary axis 30 carries out machining by changing the orientation thereof with respect to a fixed object Wm to be machined and measured (hereinafter referred to as workpiece) in the order of (1)→(2)→(3) as shown in FIG. 5 while the respective movable axes of the machine tool are simultaneously controlled so that a central axis of the machining tool 21 is perpendicular to the spherical surface of the workpiece Wm. Instructing the machine tool to perform machining while continually orienting the central axis of the machining tool 21 in the direction perpendicular to the surface to be machined of the workpiece Wm has conventionally been performed, and a machining program for carrying out this machining is also conventionally known.

Therefore, by mounting the on-machine measuring device 1 (more specifically, the rotary axis 30 on which the on-machine measuring device 1 and the machining device 20 are mounted) on the machine tool and using a machining NC program which treats the on-machine measuring device 1 as one of tools and simultaneously controls the respective axes of the machine tool, it is possible to control the orientation of the central axis of the probe 1b and the position of the spherical measuring head 1f in the on-machine measuring device 1, thereby causing the spherical measuring head 1f to contact and follow the surface of the workpiece.

FIG. 6 is a diagram for explaining measurement by the on-machine measuring device 1 in the case where the on-machine measuring device 1 and the machining device 20 are mounted on one rotary axis 30. After the workpiece Wm is machined by the machining device 20 mounted on the rotary axis 30 together with the on-machine measuring device 1 in the manner shown in FIG. 5, measurement is carried out by the on-machine measuring device 1 according to a measurement program by changing the orientation of the on-machine measuring device 1 with respect to the fixed workpiece Wm in the order of (1)→(2)→(3), as shown in FIG. 6, while the respective movable axes of the machine tool (see FIG. 1) are simultaneously controlled so that the central axis of the probe 1b is perpendicular to the spherical surface of the workpiece Wm. The measurement program for performing the on-machine measurement by the on-machine measuring device 1 can be created using the machining program. In this case, the measurement program is created by modifying the machining program considering the orientation and the distance (namely, displacement) from the tip end (cutting edge) of the machining tool 21 to the point where the central axis of the probe 1b intersects with the spherical measuring head 1f. Since the machining program can be used to create the measurement program, the trouble of creating the measurement program from scratch can be saved.

An example of five-axis machining tool having an on-machine measuring device to which the present invention is applicable has been described above. The following is a description of a method for calculating a probe mounting position in on-machine measurement according to the present invention.

Figure 7:
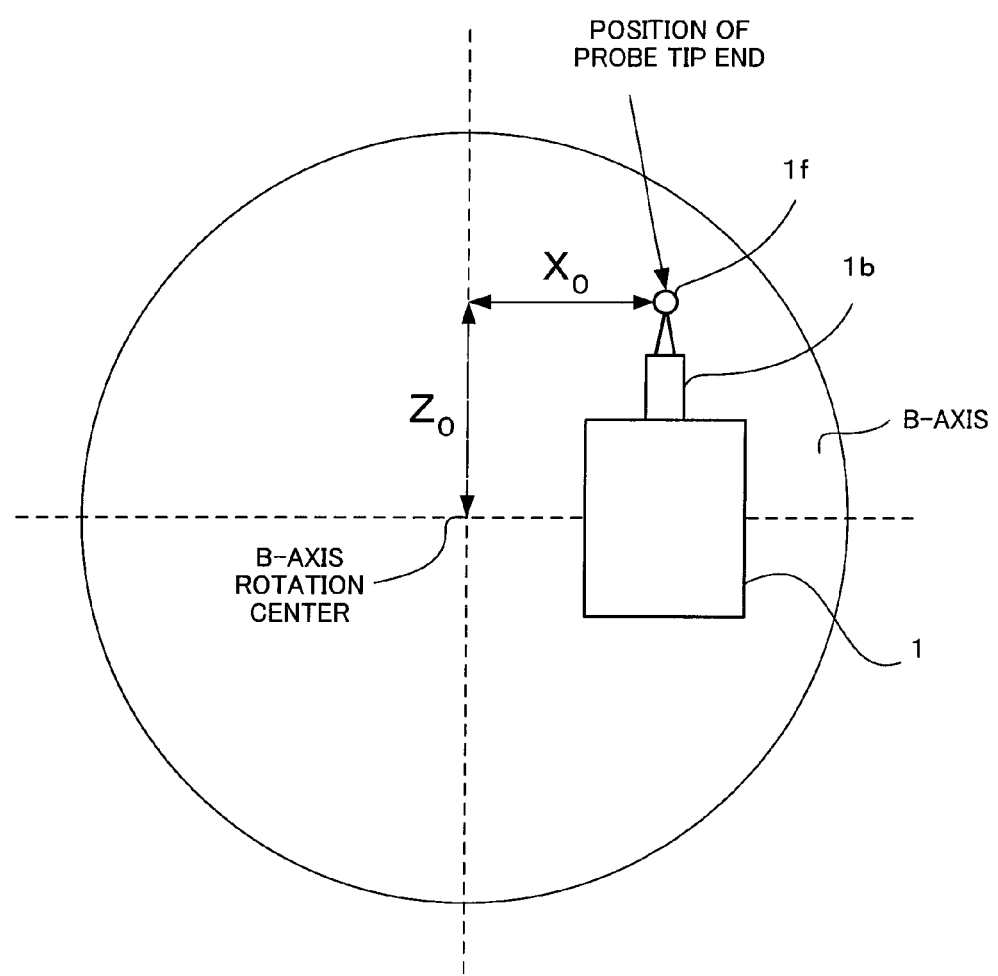
FIG. 7 is a diagram for explaining a definition for the distance between a center of a rotary axis (B-axis) and a tip end of a probe.

FIG. 7 is a diagram for explaining a definition for the distance between a center of a rotary axis and a tip end of a probe of an on-machine measuring device. More specifically, FIG. 7 explains a definition for the distance between a B-axis rotation center and a spherical measuring head 1f on a tip end of a probe 1b of an on-machine measuring device 1 in the case where the on-machine measuring device 1 is mounted on a surface plate of the B-axis as a rotary axis.

With the on-machine measurement using a rotary axis of a machine tool according to the present invention, distances $X_0$ and $Z_0$ in the respective linear-axis directions (X-axis direction and Z-axis direction) from the rotation center of the rotary axis on which the on-machine measuring device 1 is mounted to the spherical measuring head 1f mounted on the tip end of the probe 1b of the on-machine measuring device 1 can be easily and accurately calculated. Thus, ultra-precision measurement on the order of nanometers can be achieved even when mounting and dismounting of the on-machine measuring device 1 are repeated. A calculated probe mounting position ($X_0$, $Z_0$) is obtained based on the distances $X_0$ and $Z_0$ in the respective linear-axis directions.

Figure 8A:
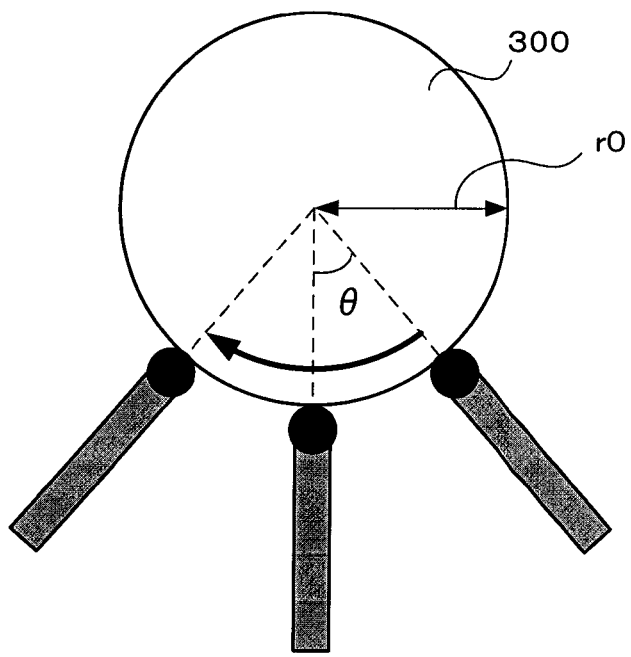
FIGS. 8A and 8B show normal and abnormal trajectories, respectively, obtained when on-machine measurement with the additional use of a rotary axis is performed based on a probe mounting position $(X_0, Z_0)$ calculated by flat-plate measurement shown in FIG. 15.
Figure 8B:
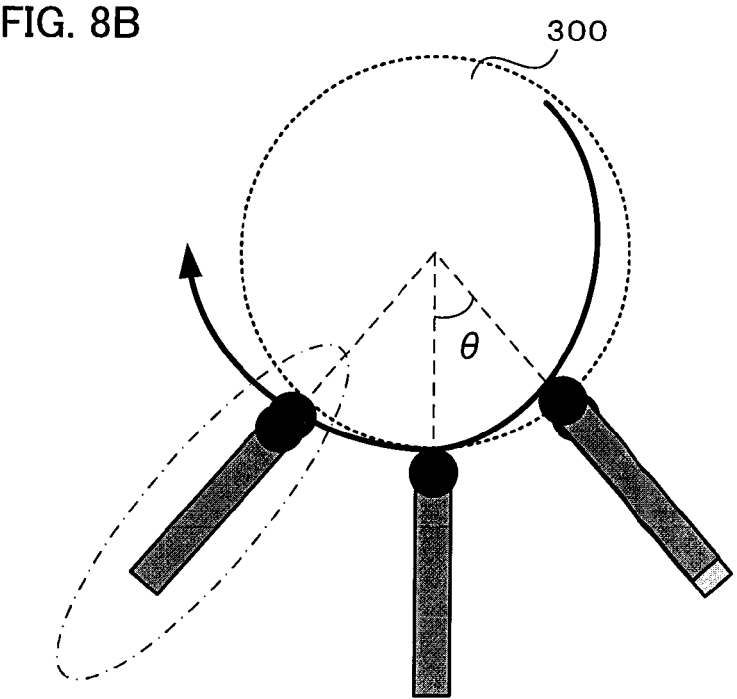

FIGS. 8A and 8B show normal and abnormal trajectories, respectively, obtained when on-machine measurement with the additional use of a rotary axis is performed based on the probe mounting position ($X_0$, $Z_0$) calculated by flat-plate measurement (described later with reference to FIG. 15) or the like. When the on-machine measurement with the additional use of the rotary axis is performed for a reference sphere 300 having a predetermined radius r0, based on the probe mounting position ($X_0$, $Z_0$) obtained by flat-plate measurement or the like, the state shown in FIG. 8A is established if the trajectory is normal.

It is difficult, however, to avoid production of noise and temperature drift during flat-plate measurement or the like, and under influence of these factors, the measurement errors are amplified during an arithmetic operation for obtaining the calculated probe mounting position ($X_0$, $Z_0$). Thereupon, the calculated probe mounting position ($X_0$, $Z_0$) differs from a real probe mounting position. If the on-machine measurement with the additional use of the rotary axis is performed for the reference sphere 300 based on the calculated probe mounting position, which is different from the real probe mounting position, the abnormal trajectory is described, as indicated by the solid arrow line in FIG. 8B.

Figure 9A:
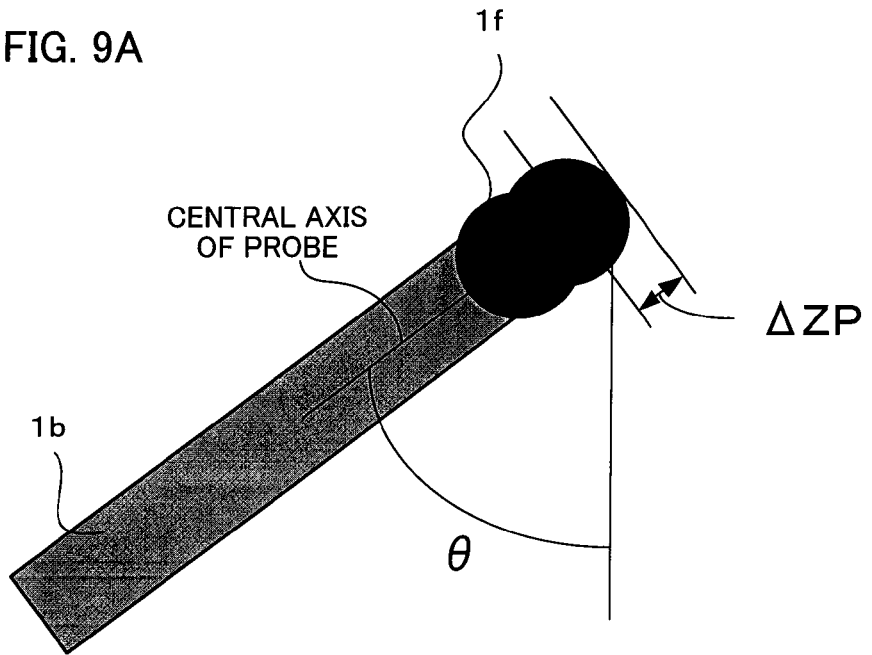
Figure 9B:
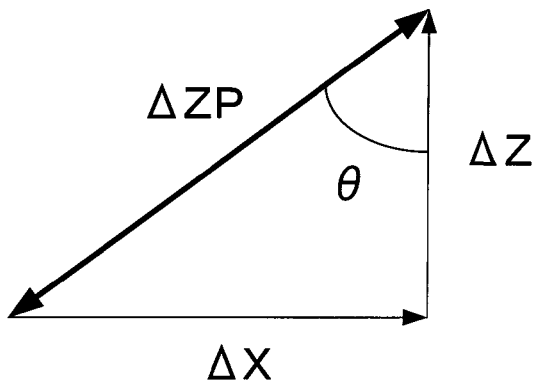

FIGS. 9A and 9B illustrate a theoretical formula for changing the abnormal trajectory shown in FIG. 8B into the normal trajectory and the way the real probe mounting position ($X_0$, $Z_0$) is obtained according to the formula. FIG. 9A is an enlarged diagram of a region enclosed by the dash-dotted line in FIG. 8B and shows the orientation of the central axis of the probe 1b rotated through an angle θ from a reference position. A measurement error ΔZP of the abnormal trajectory shown in FIG. 8B can be divided into two error components, an error component ΔX (=ΔZP×sin θ) in the X-axis direction and an error component ΔZ (=ΔZP×cos θ) in the Z-axis direction, based on the rotational angle θ of the rotary axis on which the on-machine measuring device is mounted.

The normal trajectory can be located by canceling the error with the error components ΔX and ΔZ reflected in measurement coordinates. In other words, space coordinates (X, Z, θ) of the tip end of the spherical measuring head 1f mounted on the tip end of the probe 1b, based on the cancellation of the error components of the reference sphere 300 at the fixed rotational angle θ, are calculated and obtained. If the calculated probe mounting position ($X_0$, $Z_0$) is obtained, then it is regarded as the real probe mounting position. Since the accuracy of the reference sphere 300 absolutely affects the calculation of the measurement error ΔZP, the circularity deviation of the reference sphere 300 should preferably be 100 nm or less to ensure an absolute accuracy of 100 nm or less.

An algorithm of processing for improving the accuracy of the probe mounting position by measuring the reference sphere 300 will now be described with reference to FIGS. 10 to 14.

Figure 10:
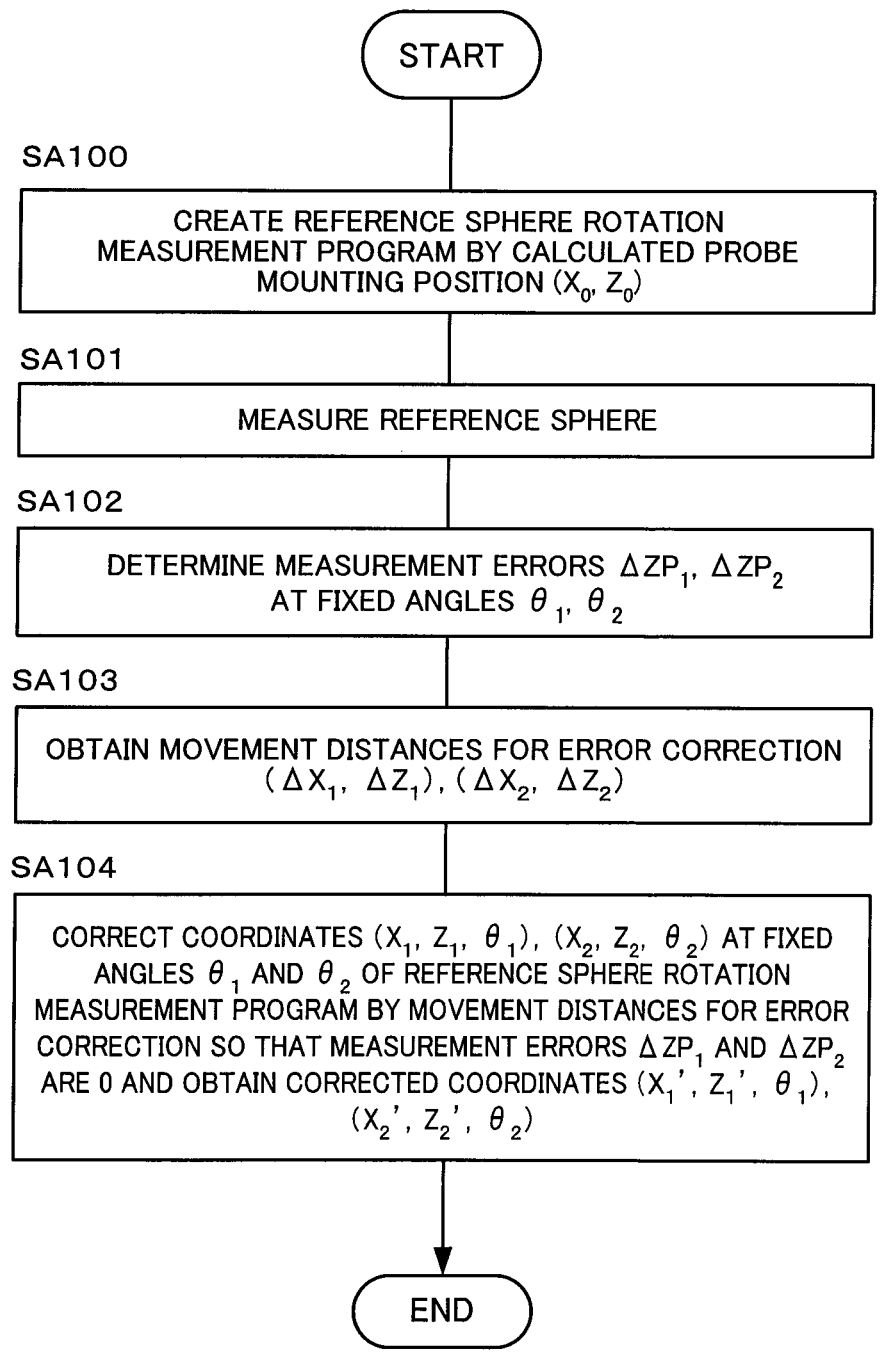
FIG. 10 is a flowchart illustrating processing in a preliminary stage (zeroth stage) of measurement for improving the accuracy of the probe mounting position (distance between the B-axis rotation center and a measuring head on the probe of the on-machine measuring device) calculated by flat-plate measurement by measuring a reference sphere by means of the probe.

FIG. 10 is a flowchart illustrating processing in a preliminary stage (zeroth stage) of measurement for improving the accuracy of the probe mounting position (distance between the B-axis rotation center and the measuring head on the probe of the on-machine measuring device) calculated by flat-plate measurement by measuring the reference sphere by means of the probe. This processing will now be described step by step.

[Step SA100] A reference sphere rotation measurement program is created with the calculated probe mounting position $(X_0, Z_0)$.

[Step SA101] The reference sphere 300 is measured by means of the probe 1b.

[Step SA102] Measurement errors $\Delta ZP_1$ and $\Delta ZP_2$ at the fixed angles $\theta_1$ and $\theta_2$ ($\theta_1 \neq \theta_2$) are determined.

[Step SA103] "Movement distances for error correction" $(\Delta X_1, \Delta Z_1)$ and $(\Delta X_2, \Delta Z_2)$ are obtained from the determined measurement errors $\Delta ZP_1$ and $\Delta ZP_2$.

[Step SA104] Coordinates $(X_{1z}, Z_1, \theta_1)$ and $(X_2, Z_2, \theta_2)$ at the fixed angles $\theta_1$ and $\theta_2$ of the reference sphere measurement program are corrected by the "movement distances for error correction" $(\Delta X_1, \Delta Z_1)$ and $(\Delta X_2, \Delta Z_2)$ obtained in Step SA103 so that the measurement errors $\Delta ZP_1$ and $\Delta ZP_2$ determined in Step SA102 are zero. Then, the thus corrected coordinates are defined to be $(X_1', Z_1', \theta_1)$ and $(X_2', Z_2', \theta_2)$, whereupon this processing terminates.

FIG. 11 is a flowchart illustrating a preliminary stage (first stage) for improving the accuracy of the calculated probe mounting position $(X_0, Z_0)$ (distance between the B-axis rotation center and the measuring head on the probe 1b of the on-machine measuring device) by measuring the reference sphere 300 by means of the probe 1b. This processing will now be described step by step.

[Step SB100] The X and Z values of the probe mounting position $(X_0, Z_0)$ are each changed by $-1$ nanometer (nm) at a time.

[Step SB101] A reference sphere measurement program is created based on the changed coordinates, and coordinates $(X_{S1}, Z_{S1}, \theta_1)$ and $(X_{S2}, Z_{S2}, \theta_2)$ at the fixed angles $\theta_1$ and $\theta_2$ are obtained.

[Step SB102] It is determined whether or not the coordinates $(X_{S1}, Z_{S1}, \theta_1)$ and $(X_{S2}, Z_{S2}, \theta_2)$ obtained in Step SB101 are coincident with the "corrected coordinates" $(X_1', Z_1', \theta_1)$ and $(X_2', Z_2', \theta_2)$ obtained in Step SA104 of FIG. 10 (or whether or not the differences between those coordinates are within a predetermined tolerance). If the coordinates are coincident (or if the decision is YES), the program proceeds to Step SB103. If not (or if the decision is NO), the program proceeds to Step SB104.

[Step SB103] The "real probe mounting position" is located by adding the "total shift amount" to the probe mounting position $(X_0, Z_0)$, whereupon this processing terminates. The "total shift amount" depends on the frequency of execution of the process of Step SB100 in the first stage of processing.

[Step SB104] It is determined whether or not the coordinates $(X_{S1}, Z_{S1}, \theta_1)$ and $(X_{S2}, Z_{S2}, \theta_2)$ obtained in Step SB101 gradually separate from the "corrected coordinates" $(X_1', Z_1', \theta_1)$ and $(X_2', Z_2', \theta_2)$ obtained in Step SA104 of FIG. 10 as the process of Step SB100, in which the X and Z values of the probe mounting position $(X_0, Z_0)$ are each changed by $-1$ nm at a time, is repeated. If the former coordinates gradually separate from the latter (or if the decision is YES), the program proceeds to Step SB105 (FIG. 12). If the former coordinates gradually approach the latter (or if the decision is NO), on the other hand, the program returns to Step SB100.

FIG. 12 is a flowchart illustrating a preliminary stage (second stage) for improving the accuracy of the calculated probe mounting position (distance between the B-axis rotation center and the measuring head on the probe of the on-machine measuring device) by measuring the reference sphere by means of the probe.

[Step SB105] The X and Z values of the probe mounting position $(X_0, Z_0)$ are changed by $-1$ nm and $+1$ nm, respectively, at a time.

[Step SB106] A reference sphere measurement program is created based on the changed coordinates, and coordinates $(X_{S1}, Z_{S1}, \theta_1)$ and $(X_{S2}, Z_{S2}, \theta_2)$ at the fixed angles $\theta_1$ and $\theta_2$ are obtained.

[Step SB107] It is determined whether or not the coordinates $(X_{S1}, Z_{S1}, \theta_1)$ and $(X_{S2}, Z_{S2}, \theta_2)$ obtained in Step SB101 are coincident with the "corrected coordinates" $(X_1', Z_1', \theta_1)$ and $(X_2', Z_2', \theta_2)$ obtained in Step SA104 of FIG. 10 (or whether or not the differences between those coordinates are within a predetermined tolerance). If the coordinates are coincident (or if the decision is YES), the program proceeds to Step SB108. If not (or if the decision is NO), the program proceeds to Step SB109.

[Step SB108] The "real probe mounting position" is located by adding the "total shift amount" to the probe mounting position $(X_0, Z_0)$, whereupon this processing terminates. The "total shift amount" depends on the frequency of execution of the process of Step SB105 in the second stage of processing.

[Step SB109] It is determined whether or not the coordinates $(X_{S1}, Z_{S1}, \theta_1)$ and $(X_{S2}, Z_{S2}, \theta_2)$ obtained in Step SB106 gradually separate from the "corrected coordinates" $(X_1', Z_1', \theta_1)$ and $(X_2', Z_2', \theta_2)$ obtained in Step SA104 of FIG. 10 as the process of Step SB105, in which the X and Z values of the probe mounting position $(X_0, Z_0)$ are changed by $-1$ nm and $+1$ nm, respectively, at a time, is repeated. If the former coordinates gradually separate from the latter (or if the decision is YES), the program proceeds to Step SB110 (FIG. 13). If the former coordinates gradually approach the latter (or if the decision is NO), on the other hand, the program returns to Step SB105.

FIG. 13 is a flowchart illustrating a preliminary stage (third stage) for improving the accuracy of the calculated probe mounting position (distance between the B-axis rotation center and the measuring head on the probe of the on-machine measuring device) by measuring the reference sphere by means of the probe.

[Step SB110] The X and Z values of the probe mounting position $(X_0, Z_0)$ are changed by $+1$ nm and $-1$ nm, respectively, at a time.

[Step SB111] A reference sphere measurement program is created based on the changed coordinates, and coordinates $(X_{S1}, Z_{S1}, \theta_1)$ and $(X_{S2}, Z_{S2}, \theta_2)$ at the fixed angles $\theta_1$ and $\theta_2$ are obtained.

[Step SB112] It is determined whether or not the coordinates $(X_{S1}, Z_{S1}, \theta_1)$ and $(X_{S2}, Z_{S2}, \theta_2)$ obtained in Step SB111 are coincident with the "corrected coordinates" $(X_1', Z_1', \theta_1)$ and $(X_2', Z_2', \theta_2)$ obtained in Step SA104 of FIG. 10 (or whether or not the differences between those coordinates are within a predetermined tolerance). If the coordinates are coincident (or if the decision is YES), the program proceeds to Step SB113. If not (or if the decision is NO), the program proceeds to Step SB114.

[Step SB113] The "real probe mounting position" is located by adding the "total shift amount" to the probe mounting position $(X_0, Z_0)$, whereupon this processing terminates.

The "total shift amount" depends on the frequency of execution of the process of Step SB110 in the third stage of processing.

[Step SB114] It is determined whether or not the coordinates $(X_{S1}, Z_{S1}, \theta_1)$ and $(X_{S2}, Z_{S2}, \theta_2)$ obtained in Step SB111 gradually separate from the "corrected coordinates" $(X_1', Z_1', \theta_1)$ and $(X_2', Z_2', \theta_2)$ obtained in Step SA104 of FIG. 10 as the process of Step SB110, in which the X and Z values of the probe mounting position $(X_0, Z_0)$ are changed by +1 nm and −1 nm, respectively, at a time, is repeated. If the former coordinates gradually separate from the latter (or if the decision is YES), the program proceeds to Step SB115 (FIG. 14). If the former coordinates gradually approach the latter (or if the decision is NO), on the other hand, the program returns to Step SB110.

FIG. 14 is a flowchart illustrating a preliminary stage (fourth stage) for improving the accuracy of the calculated probe mounting position (distance between the B-axis rotation center and the measuring head on the probe of the on-machine measuring device) by measuring the reference sphere by means of the probe.

[Step SB115] The X and Z values of the probe mounting position $(X_0, Z_0)$ are each changed by +1 nm at a time.

[Step SB116] A reference sphere measurement program is created based on the changed coordinates, and coordinates $(X_{S1}, Z_{S1}, \theta_1)$ and $(X_{S2}, Z_{S2}, \theta_2)$ at the fixed angles $\theta_1$ and $\theta_2$ are obtained.

[Step SB117] It is determined whether or not the coordinates $(X_{S1}, Z_{S1}, \theta_1)$ and $(X_{S2}, Z_{S2}, \theta_2)$ obtained in Step SB116 are coincident with the "corrected coordinates" $(X_1', Z_1', \theta_1)$ and $(X_2', Z_2', \theta_2)$ obtained in Step SA104 of FIG. 10 (or whether or not the differences between those coordinates are within a predetermined tolerance). If the coordinates are coincident (or if the decision is YES), the program proceeds to Step SB118. If not (or if the decision is NO), the program proceeds to Step SB119.

[Step SB118] The "real probe mounting position" is located by adding the "total shift amount" to the probe mounting position $(X_0, Z_0)$, whereupon this processing terminates. The "total shift amount" depends on the frequency of execution of the process of Step SB115 in the fourth stage of processing.

[Step SB119] It is determined whether or not the coordinates $(X_{S1}, Z_{S1}, \theta_1)$ and $(X_{S2}, Z_{S2}, \theta_2)$ obtained in Step SB116 gradually separate from the "corrected coordinates" $(X_1', Z_1', \theta_1)$ and $(X_2', Z_2', \theta_2)$ obtained in Step SA104 of FIG. 10 as the process of Step SB115, in which the X and Z values of the probe mounting position $(X_0, Z_0)$ are each shifted by +1 nm at a time, is repeated. If the former coordinates gradually separate from the latter (or if the decision is YES), the program proceeds to Step SB120. If the former coordinates gradually approach the latter (or if the decision is NO), on the other hand, the program returns to Step SB115.

[Step SB120] "Abnormality processing" is performed, whereupon this processing terminates. In this "abnormality processing", an indication of inability to locate the probe mounting position or the like is displayed on a display screen of a personal computer or the like. In this case, an operator executes the zeroth to fourth stages of processing again.

The flowcharts of FIGS. 10 to 14 will be additionally explained. It takes a huge time to perform measurement in the preliminary stage (zeroth stage) and obtain a measurement error on each occasion. According to the present invention, therefore, actual error measurement is performed in the preliminary stage being the zero stage. Comparisons are made between the coordinates of the linear axes at the angles $\theta_1$ and $\theta_2$ of the measurement program. The "total shift amount" for the first to fourth stages is the sum of shift amounts in the X- and Z-axis directions in each stage. The "total shift amount" is reset to zero when one stage is replaced by another (e.g., when the first stage of processing is replaced by the second stage).

Since the "shift amount" in Step SB100 of FIG. 11, Step SB105 of FIG. 12, Step SB110 of FIG. 13, or Step SB115 of FIG. 14 is assumed to be based on ultra-precision measurement, it is equalized to the resolution of the on-machine measuring device 1. Alternatively, the "shift amount" may be adjusted to an integral multiple of the resolution. The "shift amount" is added to the position (FIG. 7) of the tip end of the measuring head relative to the central axis of the rotary axis, and the objects of comparison are the X- and Z-axis coordinates $(X_{S1}, Z_{S1}, \theta_1)$ and $(X_{S2}, Z_{S2}, \theta_2)$ at the two angles $\theta_1$ and $\theta_2$ of the measurement program.

For the decision in Step SB102 of FIG. 11, Step SB107 of FIG. 12, Step SB112 of FIG. 13, or Step SB117 of FIG. 14, it may be determined whether or not the differences between the coordinates $(X_{S1}, Z_{S1}, \theta_1)$ and $(X_{S2}, Z_{S2}, \theta_2)$ obtained in Step SB101 and the "corrected coordinates" $(X_1', Z_1', \theta_1)$ and $(X_2', Z_2', \theta_2)$ obtained in Step SA104 of FIG. 10 are within predetermined tolerances (e.g., 10 nm), not whether or not those coordinates are completely coincident with one another. If the differences are within the tolerances, in this case, the coordinates are regarded as "coincident".

The X- and Z-axis coordinates $(X_{S1}, Z_{S1}, \theta_1)$ and $(X_{S2}, Z_{S2}, \theta_2)$ at the two angles $\theta_1$ and $\theta_2$ are obtained after creating a reference sphere measurement program based on a "newly calculated probe mounting position" $(X_0, Z_0)$ that is obtained by adding [resolution×integer (=total shift amount)] to the calculated probe mounting position $(X_0, Z_0)$. The reference sphere measurement program is a point group measurement program created at a pitch (related to angle) that satisfies a required tolerance. The X- and Z-axis coordinates at the angles $\theta_1$ and $\theta_2$ are extracted individually.

Further, the first to fourth stages of processing may be performed in any desired order without being restricted to the aforementioned order (first stage→second stage→third stage→fourth stage).

The following is an additional description of how to obtain the distances $X_0$ and $Z_0$ in the X- and Z-axis directions, between the center of the rotary axis (B-axis) and the spherical measuring head 1f mounted on the tip end of the probe 1b of the on-machine measuring device, by using a flat plate.

Figure 15:
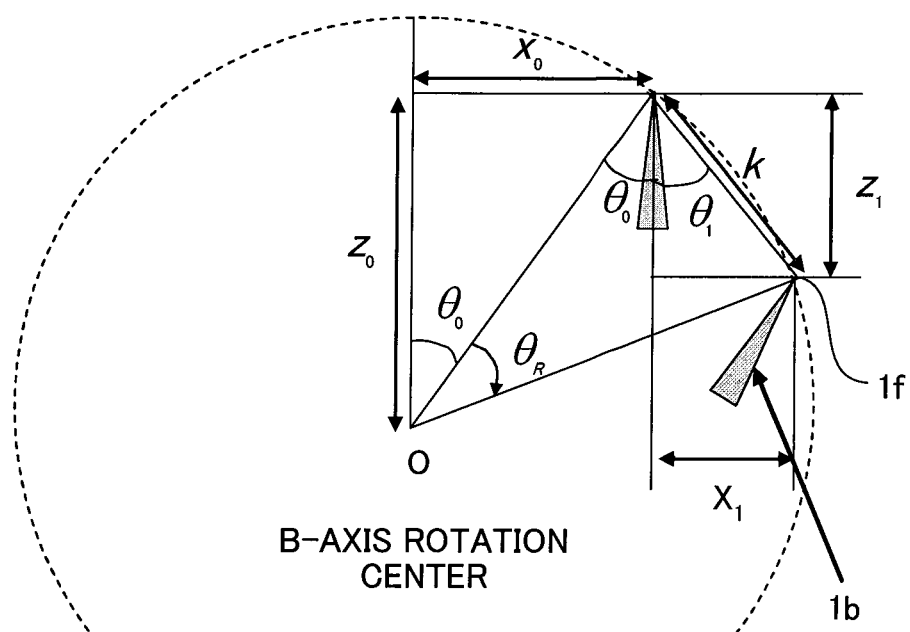
FIG. 15 is a diagram illustrating various parameters and distances $X_0$ and $Z_0$ in the respective linear-axis directions between the center of the rotary axis and the tip end of the on-machine measuring device described with reference to FIG. 7.

FIG. 15 is a diagram illustrating various parameters and the distances $X_0$ and $Z_0$ in the respective linear-axis directions between the center of the rotary axis and the tip end of the on-machine measuring device described with reference to FIG. 7. The radius R of the spherical measuring head 1f mounted on the tip end of the probe 1b is ignored, that is, the measuring head 1f is assumed to be a point without a radius. The position of the spherical measuring head 1f, which is a tip end point of the probe 1b on the X-Z plane (FIG. 1) where the rotational angle on the B-plane is zero (with the probe 1b parallel to the Z-axis), is estimated. In FIG. 15, the measuring head rod 1e and the spherical measuring head 1f shown in FIG. 2 are omitted, and the probe 1b is shown as a whole.

The radius R of the spherical measuring head 1f is ignored because the estimation of the distance from the center of the rotary axis is made mathematically complicated by its presence. If the radius R of the spherical measuring head if is ignored, the obtained distances $X_0$ and $Z_0$ in the respective linear-axis directions are equal to the distance between the B-axis rotation center and the center of the spherical measuring head 1f.

The following is a description of a calculation formula for obtaining the distances in the respective linear-axis directions between the B-axis rotation center O and the spherical measuring head 1f of the probe 1b of the on-machine measuring device 1. In this calculation, as described above, the radius R of the spherical measuring head 1f is ignored. The position of the tip end point of the probe 1b on the X-Z plane with the rotational angle of the B-axis at 0 degree (with the probe 1b parallel to the Z-axis) is estimated. When this is done, the distances in the X- and Z-axis directions from the B-axis rotation center O to the tip end point of the probe 1b and the angle between the Z-axis direction and the tip end point of the probe 1b are given by $X_0$, $Z_0$ and $\theta_0$, respectively. If the axis of the probe 1b is further rotated from the angle $\theta_0$ to an angle $\theta_R$, the relation of $\theta_1$ to $\theta_R$ and $\theta_0$ can be represented by the following expression (1). Further, $\theta_1$ can be calculated according to the following expression (2). Expressions (1) to (10) can be easily understood with reference to FIG. 15.

$$\theta_1 = \frac{\pi - \theta_R}{2} - \theta_0 \quad (1)$$

$$\theta_1 = \tan^{-1} \frac{x_1}{z_1} \quad (2)$$

$\theta_0$ can be represented by the following expression (3) based on expressions (1) and (2).

$$\theta_0 = \frac{\pi - \theta_R}{2} - \tan^{-1} \frac{x_1}{z_1} \quad (3)$$

Further, the following expressions (4) and (5) hold.

$$\frac{k/2}{\sqrt{x_0^2 + z_0^2}} = \sin(\theta_R/2) \quad (4)$$

$$k = \sqrt{x_1^2 + z_1^2} \quad (5)$$

Based on expressions (4) and (5), the following expression (6) holds.

$$\sqrt{x_0^2 + z_0^2} = \frac{\sqrt{x_1^2 + z_1^2}}{2\sin(\theta_R/2)} \quad (6)$$

Furthermore, the following relations of expressions (7) and (8) hold for $\theta_0$.

$$\frac{x_0}{\sqrt{x_0^2 + z_0^2}} = \sin\theta_0 \quad (7)$$

$$\frac{z_0}{\sqrt{x_0^2 + z_0^2}} = \cos\theta_0 \quad (8)$$

The following expressions (9) and (10) hold based on expressions (3) to (8). Expressions (9) and (10) indicate that the distances $X_0$ and $Z_0$ in the respective linear-axis directions are functions of $X_1$, $Z_1$, $\theta_0$ and $\theta_R$. Thus, the probe mounting position in on-machine measurement can be calculated by obtaining $X_1$, $Z_1$, $\theta_0$ and $\theta_R$.

$$x_0 = \frac{\sqrt{x_1^2 + z_1^2}}{2\sin(\theta_R/2)} \times \sin\theta_0 \quad (9)$$

$$z_0 = \frac{\sqrt{x_1^2 + z_1^2}}{2\sin(\theta_R/2)} \times \cos\theta_0 \quad (10)$$

Then, the flat plate against which the measuring head mounted on the tip end of the probe is held is located so as to at least intersect with all the three linear axes except one that is aligned with the direction of the rotary axis. In this state, $X_1$, $Z_1$, $\theta_0$ and $\theta_R$ can be obtained by controlling the linear axes and the rotary axis. Thus, the probe mounting position ($X_0$, $Z_0$) calculated according to expressions (1) to (10) can be obtained.

The distances $X_0$ and $Z_0$ may be obtained by measuring the position of the tip end of the probe by using a three-dimensional measuring device instead of using the flat plate.

The invention claimed is:

1. A method for calculating a probe mounting position in an on-machine measuring device mounted on a single rotary axis of a machine tool having at least three linear axes and the rotary axis, wherein the three linear axes extend at right angles to one another, one of the linear axes is aligned with the direction of the rotary axis, a probe of the on-machine measuring device moves at right angles to the direction of the rotary axis, a displacement of the probe is detected by a probe position detecting device mounted on the on-machine measuring device, and the distance between a rotation center of the rotary axis and a tip end of a measuring head mounted on a tip end of the probe is calculated with the tip end of the measuring head held against a reference sphere attached to the machine tool, the calculating method comprising:

a first step of setting linear axes which move in two directions perpendicular to the rotary axis, out of the linear axes, as first and second linear axes, and previously defining a position of the tip end of the measuring head relative to the center of the rotary axis as coordinates of the first and second linear axes;

a second step of creating a measurement program for measurement performed at two different predetermined angles of the rotary axis by moving the first and second linear axes so that a central axis of the probe is perpendicular to the surface of the reference sphere;

a third step of obtaining, as respective measurement errors at the two angles of the rotary axis, utilizing a computer, errors between original displacement data of the probe and displacement data of the probe measured at the two angles according to the created measurement program;

a fourth step of obtaining displacements of the first and second linear axes with which the measurement errors become zero respectively, as respective first correction amounts at the two angles, utilizing a computer;

a fifth step of obtaining, as reference coordinates, utilizing a computer, coordinates of the first and second linear axes at the two angles of the measurement program, corrected with the first correction amounts, and further obtaining, as corrected coordinates, coordinates of the first and second linear axes at the two angles, using the measurement program created in the second step, based on the position obtained by correcting the position of the tip end of the measuring head, defined in the first step, with second correction amounts which are increased or decreased in stages respectively by minimum units equivalent to position detection resolutions of the linear axes, within a predetermined range; and a sixth step of correcting, utilizing a computer, the coordinates of the first and second linear axes, defined in the first step, with the second correction amount with which the differences between the reference coordinates and the corrected coordinates, individually obtained in the fifth step, become minimum, and obtaining final coordinates of the first and second linear axes at the position of the tip end of the measuring head relative to the center of the rotary axis.

2. The method for calculating a probe mounting position in an on-machine measuring device according to claim 1, wherein the fifth step comprises:

a first sub-step of the fifth step of obtaining, as the reference coordinates, the coordinates of the first and second linear axes at the two angles of the measurement program, corrected with the first correction amounts, and further obtaining, as the corrected coordinates, the coordinates of the first and second linear axes at the two angles, using the measurement program created in the second step, based on a position obtained by subtracting from the coordinates of the first and second linear axes, defined in the first step, the second correction amounts which are obtained by multiplying the position detection resolutions of the linear axes by a positive integer within a predetermined range; and a second sub-step of the fifth step of correcting the coordinates of the first and second linear axes, defined in the first step, with the second correction amounts with which the differences between the reference coordinates and the corrected coordinates, obtained in the first sub-step of the fifth step, become less than a predetermined error, and obtaining the final coordinates of the first and second linear axes at the position of the tip end of the measuring head relative to the center of the rotary axis;

and further, if the error is not less than the predetermined error in the first and second sub-steps of the fifth step, the fifth step further comprises:

a third sub-step of the fifth step of obtaining, as the corrected coordinates, the coordinates of the first and second linear axes at the two angles, using the measurement program created in the second step, based on a position obtained by subtracting the second correction amounts from the coordinates of the first linear axis defined in the first step and further adding the second correction amounts to the coordinates of the second linear axis defined in the first step; and a fourth sub-step of the fifth step of correcting the coordinates of the first and second linear axes, defined in the first step, with the second correction amounts with which the differences between the reference coordinates and the corrected coordinates, obtained in the third sub-step of the fifth step, become less than a predetermined error, and obtaining the final coordinates of the first and second linear axes at the position of the tip end of the measuring head relative to the center of the rotary axis;

and further, if the error is not less than the predetermined error in the first through fourth sub-steps of the fifth step, the fifth step further comprises:

a fifth sub-step of the fifth step of obtaining, as the corrected coordinates, the coordinates of the first and second linear axes at the two angles, using the measurement program created in the second step, based on a position obtained by adding the second correction amounts to the coordinates of the first linear axis defined in the first step and further subtracting the second correction amounts from the coordinates of the second linear axis defined in the first step; and a sixth sub-step of the fifth step of correcting the coordinates of the first and second linear axes, defined in the first step with the second correction amounts with which the differences between the reference coordinates and the corrected coordinates, obtained in the fifth sub-step of the fifth step, become less than a predetermined error, and obtaining the final coordinates of the first and second linear axes at the position of the tip end of the measuring head relative to the center of the rotary axis;

and further, if the error is not less than the predetermined error in the first through sixth sub-steps of the fifth step, the fifth step further comprises:

a seventh sub-step of the fifth step of obtaining, as the corrected coordinates, the coordinates of the first and second linear axes at the two angles, using the measurement program, based on a position obtained by adding the second correction amounts respectively to the coordinates of the first and second linear axes defined in the first step; and an eighth sub-step of the fifth step of correcting the coordinates of the first and second linear axes, defined in the first step, with the second correction amounts with which the differences between the reference coordinates and the corrected coordinates, obtained in the seventh sub-step of the fifth step, become less than a predetermined error, and obtaining the final coordinates of the first and second linear axes at the position of the tip end of the measuring head relative to the center of the rotary axis.

3. The method for calculating a probe mounting position in an on-machine measuring device according to claim 1, wherein the reference sphere has shape accuracy of 100 nanometers or less.

4. The method for calculating a probe mounting position in an on-machine measuring device according to claim 1, wherein the first and second steps are performed using a computer.

5. The method for calculating a probe mounting position in an on-machine measuring device according to claim 1, wherein the probe is part of the machine tool having at least three linear axes and the rotary axis, the method further comprising measuring the reference sphere with the probe.

6. The method for calculating a probe mounting position in an on-machine measuring device according to claim 1, wherein the probe is part of the machine tool having at least three linear axes and the rotary axis, the method further comprising moving, via motors of the machine tool, the tip end of the measuring head such that it is held against the reference sphere, and calculating the distance between the rotation center of the rotary axis and the tip end of the measuring head mounted on a tip end of the probe with the tip end of the measuring head held against the reference sphere.

7. The method for calculating a probe mounting position in an on-machine measuring device according to claim 1, wherein the probe is part of the machine tool having at least three linear axes and the rotary axis, the method further comprising moving the tip end of the measuring head such that it is held against the reference sphere, and, using a computer, calculating the distance between the rotation center of the rotary axis and the tip end of the measuring head mounted on a tip end of the probe with the tip end of the measuring head held against the reference sphere.

8. The method for calculating a probe mounting position in an on-machine measuring device according to claim 1, wherein the first step is performed using a computer.

9. A method for calculating a probe mounting position in an on-machine measuring device, comprising:
obtaining a system including the on-machine measuring device and a single rotary axis of a machine tool, wherein the on-machine measuring device includes the probe, and wherein the probe is mounted on the single rotary axis of the machine tool, and wherein the machine tool has at least three linear axes and the rotary axis, wherein the three linear axes extend at right angles to one another, one of the linear axes is aligned with the direction of the rotary axis, a probe of the on-machine measuring device moves at right angles to the direction of the rotary axis, a displacement of the probe is detected by a probe position detecting device mounted on the on-machine measuring device, and the distance between a rotation center of the rotary axis and a tip end of a measuring head mounted on a tip end of the probe is calculated with the tip end of the measuring head held against a reference sphere attached to the machine tool; and
calculating the probe mounting position by performing the following steps:
a first step of setting linear axes which move in two directions perpendicular to the rotary axis, out of the linear axes, as first and second linear axes, and previously defining a position of the tip end of the measuring head relative to the center of the rotary axis as coordinates of the first and second linear axes;
a second step of creating a measurement program for measurement performed at two different predetermined angles of the rotary axis by moving the first and second linear axes so that a central axis of the probe is perpendicular to the surface of the reference sphere;
a third step of moving the probe by activating motors of the system, and obtaining, as a result of the movement of the probe, as respective measurement errors at the two angles of the rotary axis, errors between original displacement data of the probe and displacement data of the probe measured at the two angles according to the created measurement program;
a fourth step of obtaining measurement signals representing displacements of the first and second linear axes with which the measurement errors become zero respectively, as respective first correction amounts at the two angles;
a fifth step of obtaining, as reference coordinates, coordinates of the first and second linear axes at the two angles of the measurement program, corrected with the first correction amounts, and further obtaining, as corrected coordinates, coordinates of the first and second linear axes at the two angles, using the measurement program created in the second step, based on the position obtained by correcting the position of the tip end of the measuring head, defined in the first step, with second correction amounts which are increased or decreased in stages respectively by minimum units equivalent to position detection resolutions of the linear axes, within a predetermined range; and
a sixth step of correcting, the coordinates of the first and second linear axes, defined in the first step, with the second correction amount with which the differences between the reference coordinates and the corrected coordinates, individually obtained in the fifth step, become minimum, and obtaining final coordinates of the first and second linear axes at the position of the tip end of the measuring head relative to the center of the rotary axis.

10. The method for calculating a probe mounting position in an on-machine measuring device according to claim 9, wherein the fifth step comprises:
a first sub-step of the fifth step of obtaining, as the reference coordinates, the coordinates of the first and second linear axes at the two angles of the measurement program, corrected with the first correction amounts, and further obtaining, as the corrected coordinates, the coordinates of the first and second linear axes at the two angles, using the measurement program created in the second step, based on a position obtained by subtracting from the coordinates of the first and second linear axes, defined in the first step, the second correction amounts which are obtained by multiplying the position detection resolutions of the linear axes by a positive integer within a predetermined range; and
a second sub-step of the fifth step of correcting the coordinates of the first and second linear axes, defined in the first step, with the second correction amounts with which the differences between the reference coordinates and the corrected coordinates, obtained in the first sub-step of the fifth step, become less than a predetermined error, and obtaining the final coordinates of the first and second linear axes at the position of the tip end of the measuring head relative to the center of the rotary axis;
and further, if the error is not less than the predetermined error in the first and second sub-steps of the fifth step, the fifth step further comprises:
a third sub-step of the fifth step of obtaining, as the corrected coordinates, the coordinates of the first and second linear axes at the two angles, using the measurement program created in the second step, based on a position obtained by subtracting the second correction amounts from the coordinates of the first linear axis defined in the first step and further adding the second correction amounts to the coordinates of the second linear axis defined in the first step; and
a fourth sub-step of the fifth step of correcting the coordinates of the first and second linear axes, defined in the first step, with the second correction amounts with which the differences between the reference coordinates and the corrected coordinates, obtained in the third sub-step of the fifth step, become less than a predetermined error, and obtaining the final coordinates of the first and second linear axes at the position of the tip end of the measuring head relative to the center of the rotary axis;
and further, if the error is not less than the predetermined error in the first through fourth sub-steps of the fifth step, the fifth step further comprises:
a fifth sub-step of the fifth step of obtaining, as the corrected coordinates, the coordinates of the first and second linear axes at the two angles, using the measurement program created in the second step, based on a position obtained by adding the second correction amounts to the coordinates of the first linear axis defined in the first step and further subtracting the second correction amounts from the coordinates of the second linear axis defined in the first step; and
a sixth sub-step of the fifth step of correcting the coordinates of the first and second linear axes, defined in the first step with the second correction amounts with which the differences between the reference coordinates and the corrected coordinates, obtained in the fifth sub-step of the fifth step, become less than a predetermined error, and obtaining the final coordinates of the first and second linear axes at the position of the tip end of the measuring head relative to the center of the rotary axis;

and further, if the error is not less than the predetermined error in the first through sixth sub-steps of the fifth step, the fifth step further comprises:

a seventh sub-step of the fifth step of obtaining, as the corrected coordinates, the coordinates of the first and second linear axes at the two angles, using the measurement program, based on a position obtained by adding the second correction amounts respectively to the coordinates of the first and second linear axes defined in the first step; and an eighth sub-step of the fifth step of correcting the coordinates of the first and second linear axes, defined in the first step, with the second correction amounts with which the differences between the reference coordinates and the corrected coordinates, obtained in the seventh sub-step of the fifth step, become less than a predetermined error, and obtaining the final coordinates of the first and second linear axes at the position of the tip end of the measuring head relative to the center of the rotary axis.

11. The method for calculating a probe mounting position in an on-machine measuring device according to claim 9, wherein the reference sphere has shape accuracy of 100 nanometers or less.

12. The method for calculating a probe mounting position in an on-machine measuring device according to claim 9, wherein the probe is part of the machine tool having at least three linear axes and the rotary axis, the method further comprising measuring the reference sphere with the probe.

13. The method for calculating a probe mounting position in an on-machine measuring device according to claim 9, the method further comprising moving, via motors of the system, the tip end of the measuring head such that it is held against the reference sphere, and calculating the distance between the rotation center of the rotary axis and the tip end of the measuring head mounted on a tip end of the probe with the tip end of the measuring head held against the reference sphere.

14. The method for calculating a probe mounting position in an on-machine measuring device according to claim 9, method further comprising moving the tip end of the measuring head such that it is held against the reference sphere, and, using a computer, calculating the distance between the rotation center of the rotary axis and the tip end of the measuring head mounted on a tip end of the probe with the tip end of the measuring head held against the reference sphere.

15. The method for calculating a probe mounting position in an on-machine measuring device according to claim 9, wherein the first step is performed using a computer.

16. The method for calculating a probe mounting position in an on-machine measuring device according to claim 9, wherein the third, fourth, fifth and sixth steps are performed using a computer.

17. The method for calculating a probe mounting position in an on-machine measuring device according to claim 9, further comprising adjusting probe mounting position data of the system based on the first through sixth steps.

18. The method for calculating a probe mounting position in an on-machine measuring device according to claim 9, wherein the method further includes calculating the probe mounting position based on measurement information stored in a storage unit in a numerical controller of the system.

* * * * *